United States Patent
Imura et al.

(10) Patent No.: US 11,767,916 B2
(45) Date of Patent: Sep. 26, 2023

(54) SLIDING COMPONENTS

(71) Applicant: Eagle Industry Co., Ltd., Tokyo (JP)

(72) Inventors: Tadatsugu Imura, Tokyo (JP); Hiroshi Suzuki, Tokyo (JP); Iwa Ou, Tokyo (JP); Yuichiro Tokunaga, Tokyo (JP)

(73) Assignee: EAGLE INDUSTRY CO., LTD.

( * ) Notice: Subject to any disclaimer, the term of this patent is extended or adjusted under 35 U.S.C. 154(b) by 109 days.

(21) Appl. No.: 17/428,262

(22) PCT Filed: Feb. 12, 2020

(86) PCT No.: PCT/JP2020/005259
§ 371 (c)(1),
(2) Date: Aug. 3, 2021

(87) PCT Pub. No.: WO2020/166589
PCT Pub. Date: Aug. 20, 2020

(65) Prior Publication Data
US 2022/0106980 A1 Apr. 7, 2022

(30) Foreign Application Priority Data
Feb. 14, 2019 (JP) ................................ 2019-024900

(51) Int. Cl.
*F16J 15/34* (2006.01)
*F16J 15/3256* (2016.01)

(52) U.S. Cl.
CPC ....... *F16J 15/3256* (2013.01); *F16J 15/3424* (2013.01)

(58) Field of Classification Search
CPC ........................... F16J 15/3256; F16J 15/3424
See application file for complete search history.

(56) References Cited

U.S. PATENT DOCUMENTS

| 3,804,424 A | 4/1974 | Gerdner ................... F16J 15/34 |
| 4,889,348 A | 12/1989 | Amundson et al. ...... F16J 15/34 |
| 5,092,612 A | 3/1992 | Victor et al. ............ F16J 15/34 |

(Continued)

FOREIGN PATENT DOCUMENTS

| CH | 677266 | 10/1987 | ............... F16J 15/34 |
| CN | 1100503 | 3/1995 | ............... F16J 15/16 |

(Continued)

OTHER PUBLICATIONS

U.S. Appl. No. 16/640,324, filed Feb. 19, 2020, Sasaki et al.
U.S. Appl. No. 17/428,912, filed Aug. 5, 2021, Ou et al.
U.S. Appl. No. 17/425,679, filed Jul. 23, 2021, Ou et al.

*Primary Examiner* — Vishal A Patel
(74) *Attorney, Agent, or Firm* — HAYES SOLOWAY P.C.

(57) ABSTRACT

To provide sliding components capable of suppressing dynamic pressure generation mechanisms from being deformed and damaged due to wear of sliding surfaces. In a pair of sliding components which is disposed at a relatively rotating position of a rotary machine, has a plurality of dynamic pressure generation mechanisms formed in a sliding surface of the sliding component by recessed portions, and is formed in an annular shape to seal a sealed fluid by sliding the sliding surfaces of the sliding components. A surface region in the periphery of the recessed portions of the sliding component is formed to be separated from an opposite region of the sliding component.

9 Claims, 16 Drawing Sheets

(56) References Cited

U.S. PATENT DOCUMENTS

| | | | |
|---|---|---|---|
| 5,180,173 A * | 1/1993 | Kimura | F16J 15/3412 277/400 |
| 5,441,283 A | 8/1995 | Pecht et al. | F16J 15/34 |
| 5,492,341 A | 2/1996 | Pecht et al. | F16J 15/34 |
| 6,189,896 B1 * | 2/2001 | Dickey | F16C 17/045 277/400 |
| 7,044,470 B2 * | 5/2006 | Zheng | F16J 15/342 277/408 |
| 9,151,390 B2 * | 10/2015 | Hosoe | F16J 15/342 |
| 9,353,867 B2 | 5/2016 | Itadani et al. | F16J 15/3448 |
| 9,371,912 B2 | 6/2016 | Hosoe et al. | F16J 15/34 |
| 9,512,923 B2 | 12/2016 | Inoue et al. | F16J 16/34 |
| 9,677,670 B2 | 6/2017 | Itadani et al. | F16J 15/3412 |
| 9,765,892 B2 | 9/2017 | Itadani et al. | F16J 15/34 |
| 9,772,037 B2 | 9/2017 | Itadani et al. | F16J 15/3412 |
| 9,829,109 B2 | 11/2017 | Itadani et al. | F16J 15/40 |
| 9,841,106 B2 | 12/2017 | Itadani et al. | F16J 15/34 |
| 9,850,953 B2 | 12/2017 | Tokunaga | F16C 33/741 |
| 10,054,230 B2 * | 8/2018 | Katori | F16J 15/34 |
| 10,337,560 B2 | 7/2019 | Tokunaga et al. | F16J 15/40 |
| 10,473,220 B2 | 11/2019 | Tokunaga et al. | F16J 15/40 |
| 10,704,417 B2 | 7/2020 | Tokunaga et al. | F01D 25/16 |
| 2002/0079648 A1 | 6/2002 | Uth | F16J 15/34 |
| 2010/0038862 A1 * | 2/2010 | Young | B23K 26/352 219/121.85 |
| 2012/0018957 A1 | 1/2012 | Watanabe | F16J 15/34 |
| 2012/0280458 A1 | 11/2012 | Artiles et al. | F16J 15/44 |
| 2014/0197660 A1 | 7/2014 | Hosoe et al. | F16J 15/40 |
| 2014/0217676 A1 | 8/2014 | Hosoe et al. | F16J 15/34 |
| 2015/0097341 A1 | 4/2015 | Inoue et al. | F16J 15/3424 |
| 2015/0115537 A1 | 4/2015 | Tokunaga | F16J 15/34 |
| 2015/0123350 A1 | 5/2015 | Itadani et al. | F16J 15/3412 |
| 2015/0260292 A1 * | 9/2015 | Inoue | F16J 15/342 277/400 |
| 2016/0033045 A1 | 2/2016 | Itadani et al. | F16J 15/3412 |
| 2017/0350407 A1 | 12/2017 | Yamamoto et al. | F04D 29/046 |
| 2018/0073394 A1 | 3/2018 | Tokunaga et al. | F01D 25/18 |
| 2018/0128377 A1 | 5/2018 | Tokunaga et al. | F16J 15/34 |
| 2018/0135699 A1 | 5/2018 | Tokunaga et al. | F16C 33/80 |
| 2018/0172162 A1 | 6/2018 | Tokunaga et al. | F16J 15/34 |
| 2018/0299015 A1 | 10/2018 | Itadani | F16J 15/3448 |
| 2019/0285115 A1 | 9/2019 | Negishi et al. | F16C 17/04 |
| 2019/0301522 A1 | 10/2019 | Negishi et al. | F16C 17/026 |

FOREIGN PATENT DOCUMENTS

| | | | |
|---|---|---|---|
| CN | 1364987 | 8/2002 | F16J 15/40 |
| CN | 101469771 | 7/2009 | F16J 15/40 |
| CN | 102483162 | 5/2012 | F16J 15/18 |
| CN | 103104707 | 5/2013 | F16J 15/16 |
| CN | 103122998 | 5/2013 | F16J 15/16 |
| CN | 103216626 | 7/2013 | F16J 15/40 |
| CN | 103732958 | 4/2014 | F16J 15/34 |
| CN | 103765060 | 4/2014 | F16J 15/34 |
| CN | 104169622 | 11/2014 | F16J 15/34 |
| CN | 104334939 | 2/2015 | F16J 15/34 |
| CN | 104919229 | 9/2015 | F16J 15/34 |
| CN | 105793628 | 7/2016 | F16J 15/34 |
| CN | 106015571 | 10/2016 | F16J 15/16 |
| CN | 106104112 | 11/2016 | F16J 15/35 |
| CN | 106352093 | 1/2017 | F16J 15/34 |
| CN | 106763778 | 5/2017 | F16J 15/16 |
| CN | 107407424 | 11/2017 | F16J 15/34 |
| CN | 107532725 | 1/2018 | F16J 15/34 |
| CN | 107735604 | 2/2018 | F16J 15/34 |
| DE | 2444544 | 9/1974 | F16J 15/34 |
| DE | 69113539 | 1/1992 | F16J 15/34 |
| DE | 102008038396 | 2/2010 | F16J 15/34 |
| EP | 2 977 654 | 1/2016 | F16J 15/34 |
| EP | 3 091 258 | 11/2016 | F16J 15/34 |
| EP | 3 543 569 | 9/2019 | F16J 15/34 |
| FR | 2342440 | 9/1977 | F16J 15/34 |
| JP | 50-45155 | 4/1975 | F16J 15/34 |
| JP | 56-15856 | 2/1981 | F16J 15/34 |
| JP | 4-50559 | 2/1992 | F16J 15/34 |
| JP | 7-71618 | 3/1995 | F16J 15/34 |
| JP | 8-502809 | 3/1996 | F16J 15/34 |
| JP | 8-303606 | 11/1996 | F16J 15/34 |
| JP | 3079562 | 6/2000 | F16J 15/34 |
| JP | 2002-286026 | 10/2002 | F16C 17/02 |
| JP | 2011-74931 | 4/2011 | F16J 15/34 |
| JP | 2012-2295 | 1/2012 | F16J 15/34 |
| JP | 2012-159152 | 8/2012 | F16J 15/34 |
| JP | 2017-141962 | 8/2017 | F16J 15/34 |
| JP | 2018-200068 | 12/2018 | F16J 15/34 |
| WO | WO 95/06212 | 3/1995 | F16J 15/34 |
| WO | WO 2012/046749 | 4/2012 | F16C 17/04 |
| WO | WO 2013/035503 | 3/2013 | F16J 15/34 |
| WO | WO2013035502 | 3/2013 | F16J 15/34 |
| WO | WO 2013/176009 | 11/2013 | F16J 15/34 |
| WO | WO 2014/024742 | 2/2014 | F16J 15/34 |
| WO | WO 2014/148317 | 9/2014 | F16J 15/34 |
| WO | WO 2015/199171 | 12/2015 | F16J 15/34 |
| WO | WO 2015/199172 | 12/2015 | F16J 15/34 |
| WO | WO 2016/167262 | 10/2016 | F16J 15/34 |
| WO | WO 2016/186015 | 11/2016 | F16J 15/34 |
| WO | WO 2016/186019 | 11/2016 | F16J 15/08 |
| WO | WO 2016/203878 | 12/2016 | F16J 15/34 |
| WO | WO 2017/061406 | 4/2017 | F16J 15/34 |
| WO | WO2018092742 | 5/2018 | F16J 15/34 |
| WO | WO 2018/105505 | 6/2018 | F16C 33/12 |

* cited by examiner

SLIDING COMPONENTS

TECHNICAL FIELD

The present invention relates to relatively rotating sliding components, for example, sliding components used in a shaft sealing device axially sealing a rotation shaft of a rotary machine in an automobile, a general industrial machine, or other sealing fields or sliding components used in a bearing of a machine in an automobile, a general industrial machine, or other bearing fields.

BACKGROUND ART

As a shaft sealing device for preventing a leakage of a sealed liquid, for example, a mechanical seal includes a pair of annular sliding components which rotates relative to each other so that their sliding surfaces are in slidable contact with each other. In such a mechanical seal, it has been recently desired to reduce energy lost due to sliding for environmental measures and sliding components such as Patent Citation 1 have been developed to reduce the energy lost due to sliding by improving the lubricity between sliding surfaces.

For example, in the sliding components shown in Patent Citation 1, a dynamic pressure generation groove is provided in a sliding surface of the sliding component to communicate with an outer radial side which is a sealed liquid side and to close one end in the sliding surface. Accordingly, when the sliding components rotate relative to each other, a sealed fluid flowing from a sealed fluid side into the dynamic pressure generation groove flows out from the closed end of the dynamic pressure generation groove to a gap between the sliding surfaces and the sliding surfaces separate from each other due to a dynamic pressure thereof and are maintained in a fluid lubrication state due to a fluid film formed thereon. As a result, lubricity is improved and low friction is realized.

Further, one shown in Patent Citation 2 is also known as the dynamic pressure generation groove. The dynamic pressure generation groove of Patent Citation 2 has a spiral shape which extends in an arc shape from an outer radial side corresponding to a sealed liquid side toward an inner radial side corresponding to a leakage side and of which an inner radial closed end is tapered.

CITATION LIST

Patent Literature

Patent Citation 1: JP H4-50559 A (Page 3, FIG. 2)
Patent Citation 2: JP 3079562 B2 (Page 4, FIG. 2)

SUMMARY OF INVENTION

Technical Problem

However, in Patent Citations 1 and 2, the fluid film is not sufficiently formed between the sliding surfaces at the initial stage of the relative rotation of the sliding components or during the low-speed rotation thereof. In addition, since waviness or fine protrusions exist on a land portion other than the dynamic pressure generation groove in the sliding surface of one sliding component provided with the dynamic pressure generation groove or a land portion in the sliding surface of the other sliding component, local wear may occur when the land portion of one sliding component and the land portion of the other sliding component slide on each other. Then, when the land portion of one sliding component is worn, there may be a bad influence on the lubricity due to the deformation and damage of the dynamic pressure generation groove. Further, also in a steady state which is a fluid lubrication state, the land portion of the sliding surface of one sliding component may be locally worn due to the entrance of contamination between the sliding surfaces.

The present invention has been made in view of such problems and an object of the present invention is to provide sliding components capable of suppressing a dynamic pressure generation mechanism from being deformed and damaged due to wear of a sliding surface.

Solution to Problem

In order to solve the foregoing problems, sliding components according to the present invention are a pair of sliding components which is constituted by a first sliding component and a second sliding component and disposed at a relatively rotating position of a rotary machine, comprising a plurality of dynamic pressure generation mechanisms formed by recessed portions that are provided in a sliding surface of the first sliding component, the first sliding component and the second sliding component being formed in an annular shape to seal a sealed fluid by sliding a land portion of the sliding surface of the first sliding component and a land portion of a sliding surface of the second sliding component to each other, wherein a surface region in a periphery of the recessed portions of the first sliding component is formed to be separated from an opposite surface region of the second sliding component opposed to the surface region of the first sliding component. According to the foregoing feature of the present invention, since the surface region in the periphery of the recessed portions constituting the dynamic pressure generation mechanisms of the first sliding component is separated from the opposite surface region of the second sliding component in the axial direction in a state in which the land portions slide on each other in a contact state or a non-contact state to be slightly separated from each other between the sliding surfaces of the first and second sliding components rotating relative to each other, the surface region in the periphery of the recessed portions of one sliding component is reliably in a non-contact state with respect to the opposite surface region of the second sliding component. Accordingly, it is possible to suppress the dynamic pressure generation mechanism from being deformed and damaged due to the wear of the sliding surface.

It may be preferable that the land portions of the first sliding component and the second sliding component each has an annular shape, the recessed portion is a recessed groove of which one end is closed, and the one end of the recessed groove extends to a region in which the land portions face each other. According to this preferable configuration, it is possible to stably separate the sliding surfaces of the first and second sliding components from each other by a dynamic pressure by allowing a fluid to flow out from a high pressure portion generating a high pressure by a dynamic pressure in the recessed portions to the a region in which the land portions of the first and second sliding components face each other.

It may be preferable that a fine recess which has an annular shape and is recessed from the land portion of the second sliding component is formed in the opposite surface region of the second sliding component. According to this preferable configuration, since the recessed portions and the annular fine recess can be formed in the sliding surfaces of different sliding components, they can be easily processed. Further, since the axial recessed amount of the fine recess is smaller than that of the recessed portions, there is almost no influence on the generation of the dynamic pressure due to the dynamic pressure generation mechanism.

It may be preferable that a boundary portion of the fine recess on a side of the land portion of the second sliding component is formed in a waveform when viewed from an axial direction. According to this preferable configuration, since the boundary portion on the land portion side of the fine recess of the second sliding component is not uniform in the radial direction, it is possible to obtain both the lubricity and the sliding torque between the sliding surfaces in a well balanced manner.

It may be preferable that adjoining two of the recessed portions are connected to each other by a fine recess. According to this preferable configuration, since the recessed portions and the fine recess are formed in the same sliding component, it is possible to generate a desired dynamic pressure without shifting the relative position between the recessed portions and the fine recess during the relative rotation of the first and second sliding components and to reliably suppress the dynamic pressure generation mechanism from being deformed and damaged due to the wear of the sliding surfaces.

It may be preferable that at least one independent land portion which is surrounded by the fine recess is formed between the adjoining two of the recessed portions. According to this preferable configuration, it is possible to receive the sliding torque between the sliding surfaces in a well balanced manner by the independent land portion while reliably suppressing the dynamic pressure generation mechanism from being deformed and damaged due to the wear of the sliding surfaces by the fine recess.

It may be preferable that a boundary portion of the fine recess on a side of the land portion of the first sliding component is formed to be disposed on a waveform when viewed from an axial direction. According to this preferable configuration, since the boundary portion on the land portion side of the fine recess is not uniform in the radial direction, it is possible to obtain both the lubricity and the sliding torque between the sliding surfaces in a well balanced manner.

It may be preferable that each of the recessed portions is an inclined groove. According to this preferable configuration, since the recessed portion is inclined with respect to the radial direction, it is possible to obtain a large pressure due to a long distance from a fluid inlet to a high pressure portion generating a high dynamic pressure.

It may be preferable that each of the recessed portions communicates with a leakage side. According to this preferable configuration, it is possible to reduce the leakage of the sealed fluid to the leakage side by the dynamic pressure generation mechanisms. In addition, since a distance between the sliding surfaces in the surface region in the periphery of the recessed portion of the dynamic pressure generation mechanism is longer than a distance between the sliding surfaces in the region in which the land portions of the pair of sliding components face each other by the fine recess, it is possible to suppress the wear of the sliding surfaces due to the entrance of contamination and the like mixed with the fluid returned to the sealed fluid side by the dynamic pressure generation mechanisms.

It may be preferable that the sliding surface of the first sliding component is provided with specific dynamic pressure generation mechanisms which are disposed on a sealed fluid side with respect to the dynamic pressure generation mechanisms and which are formed by recessed portions independent from the dynamic pressure generation mechanism, and wherein a surface region in a periphery of the recessed portions of the specific dynamic pressure generation mechanisms in the first sliding component is formed to be separated from an opposite surface region of the second sliding component opposed to the surface region of the first sliding component. According to this preferable configuration, it is possible to reduce the leakage of the sealed fluid to the leakage side by the dynamic pressure generation mechanisms while generating an appropriate fluid film between the sliding surfaces by separating the sliding surfaces from each other by the specific dynamic pressure generation mechanisms during the relative rotation of the first and second sliding components. In addition, since the surface region in the periphery of the recessed portion constituting the dynamic pressure generation mechanism is reliably in a non-contact state with respect to the opposite region of the second sliding component in a state in which the land portions slide on each other in a contact state or a non-contact state to be slightly separated from each other between the sliding surfaces of the first and second sliding components rotating relative to each other, it is possible to suppress the dynamic pressure generation mechanisms and the specific dynamic pressure generation mechanisms from being deformed and damaged due to the wear of the sliding surfaces.

DESCRIPTION OF EMBODIMENTS

Figure 1:
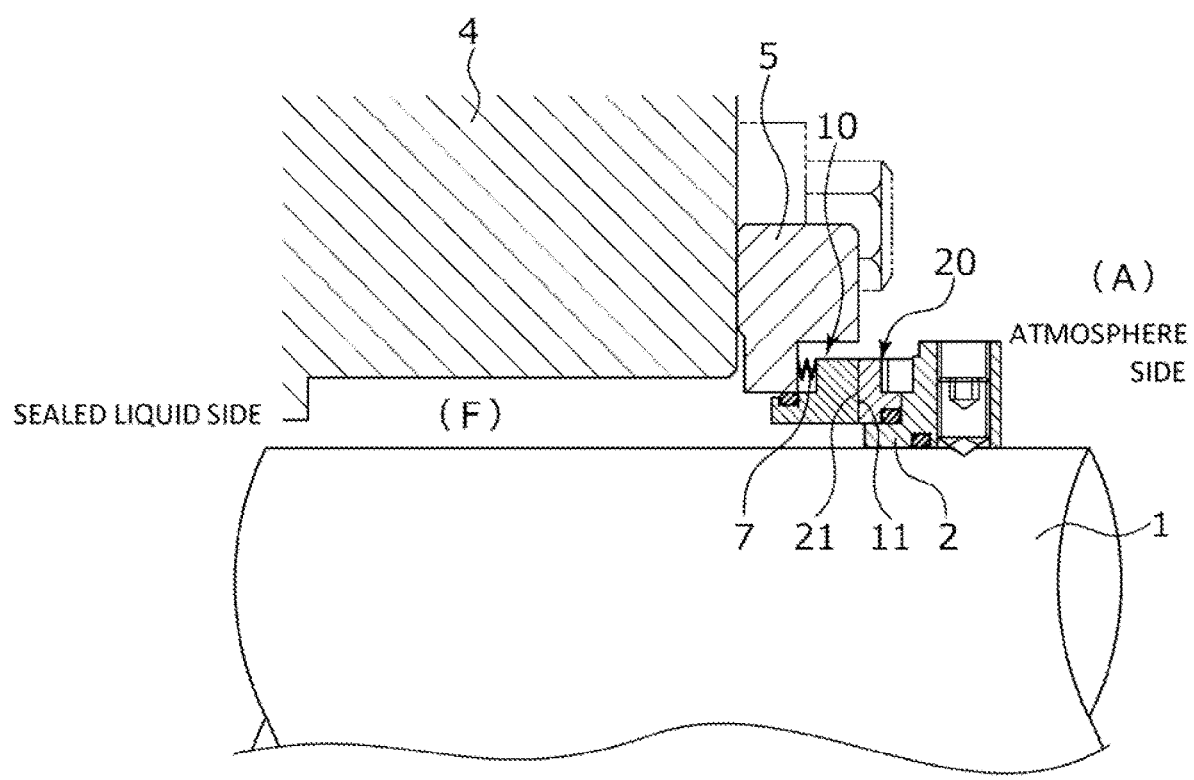
FIG. 1 is a longitudinal sectional view illustrating an example of a mechanical seal including sliding components according to a first embodiment of the present invention.

Modes for implementing sliding components according to the present invention will be described below based on embodiments.

First Embodiment

A pair of sliding components according to a first embodiment of the present invention will be described with reference to FIGS. 1 to 5. Additionally, in this embodiment, an example in which the sliding component is a mechanical seal will be described. Further, an outer radial side of the sliding component constituting the mechanical seal will be described as an atmosphere side (i.e., low pressure side) which is a leakage side and an inner radial side thereof will be described as a sealed liquid side (i.e., high pressure side) which is a sealed fluid side. Further, for convenience of description, dots may be added to grooves and the like formed on a sliding surface in the drawings.

A mechanical seal for a general industrial machine illustrated in FIG. 1 is an outside type that seals a sealed liquid F that tends to leak from the inner radial side of the sliding surface toward the outer radial side thereof and mainly includes an annular rotating seal ring 20 which is a sliding component provided in a rotation shaft 1 through a sleeve 2 to be rotatable together with the rotation shaft 1 and an annular stationary seal ring 10 which is a sliding component provided in a seal cover 5 fixed to a housing 4 of an installation target device not to be rotatable and to be movable in the axial direction. When the stationary seal ring 10 is biased in the axial direction by a bellows 7, a sliding surface 11 of the stationary seal ring 10 and a sliding surface 21 of the rotating seal ring 20 slide closely with each other.

The stationary seal ring 10 and the rotating seal ring 20 are typically formed of SiC (as an example of hard material) or a combination of SiC (as the example of hard material) and carbon (as an example of soft material), but the present invention is not limited thereto. Any sliding material is applicable as long as the sliding material is used as the sliding material for the mechanical seal. In addition, examples of SiC include a sintered body using boron, aluminum, carbon, and the like as a sintering aid and materials composed of two or more types of phases having different components and compositions, for example, SiC obtained by dispersing graphite particles, reaction sintered SiC composed of SiC and Si, SiC—TiC, SiC—TiN, and the like and examples of carbon include carbon obtained by mixing carbon materials and graphite materials, resin molded carbon, sintered carbon, and the like. In addition to the above sliding materials, metal materials, resin materials, surface modification materials (coating materials), composite materials, and the like can also be applied.

Figure 2:
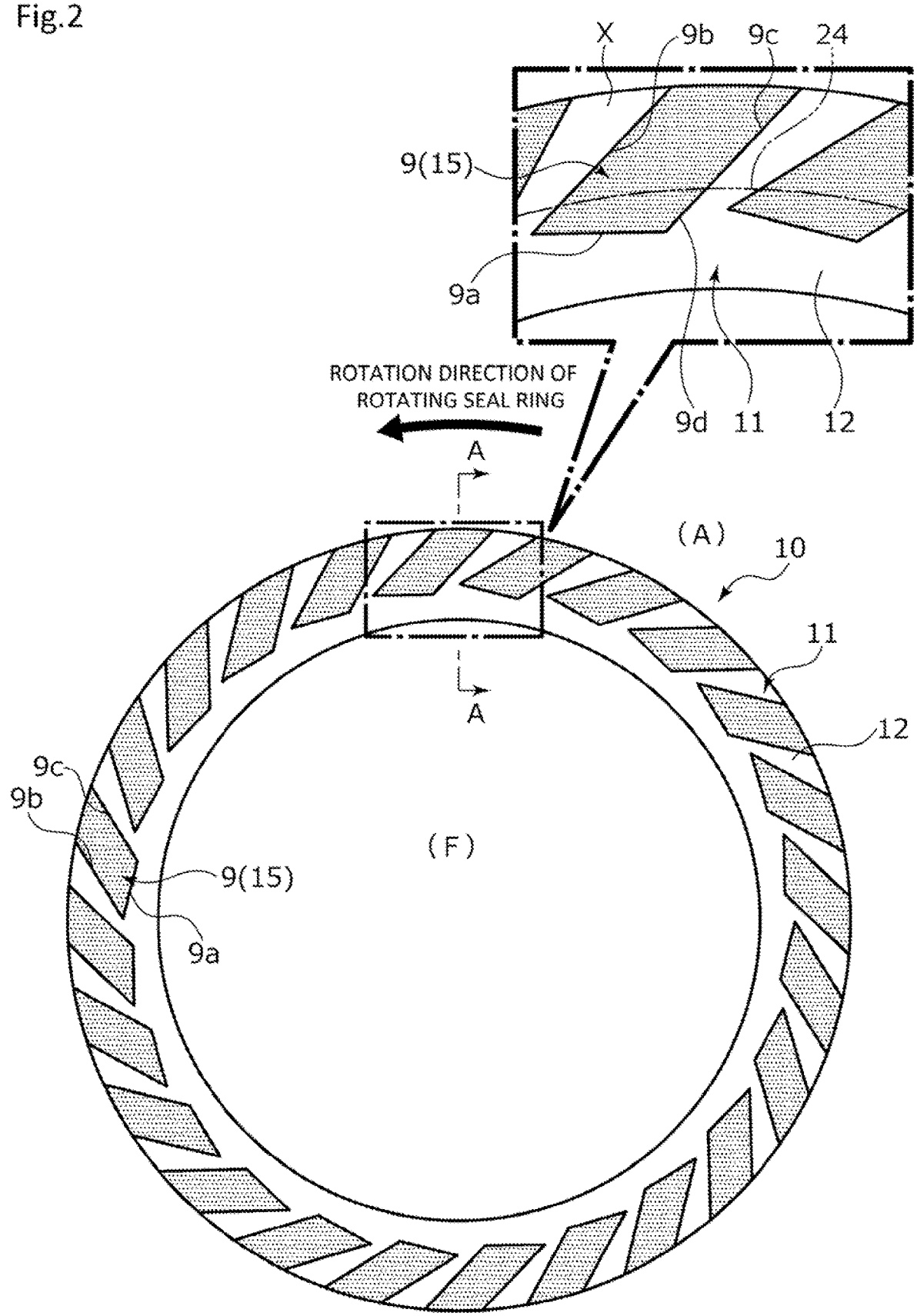
FIG. 2 is a view in which a sliding surface of a stationary seal ring in the first embodiment is viewed from the axial direction.

As illustrated in FIG. 2, the rotating seal ring 20 is adapted to rotate relative to the stationary seal ring 10 as indicated by an arrow and a plurality of dynamic pressure generation mechanisms 15 are arranged on the outer radial portion of the sliding surface 11 of the stationary seal ring 10 at equal intervals in the circumferential direction of the stationary seal ring 10. A portion other than the dynamic pressure generation mechanism 15 of the sliding surface 11 is a land portion 12 which is formed as a flat surface. That is, the land portion 12 is formed such that radial portions respectively formed between the inner radial side annular portion not provided with the dynamic pressure generation mechanism 15 and the dynamic pressure generation mechanism 15 are continuous to each other in the sliding surface 11 of the stationary seal ring 10.

The dynamic pressure generation mechanism 15 is formed by an inclined groove 9 which corresponds to a recessed portion and a recessed groove extending to be inclined with respect to the radial direction of the sliding surface 11 such that one end on the inner radial side is closed and the other end on the outer radial side communicates with the atmosphere side. The inclined groove 9 includes a wall surface 9a which is slightly recessed with respect to the land portion 12 and is inclined with respect to the rotation direction at one end on the inner radial side and side walls 9b and 9c which are inclined with respect to the radial direction from the other end on the outer radial side. In the inclined groove 9, as illustrated in the enlarged portion of FIG. 2, a closed end portion 9d formed by the wall surface 9a and the inner radial side end portions of the side walls 9b and 9c extend from a step 24 which is a boundary portion between a land portion 22 and a fine recess 23 in the sliding surface 21 of the rotating seal ring 20 to be described later to the inner radial side position. That is, the closed end portion 9d of the inclined groove 9 is surrounded by the land portion 12 and extends to a region in which the annular portion of the land portion 12 of the stationary seal ring 10 faces the annular portion of the land portion 22 of the rotating seal ring 20. In addition, the wall surface 9a does not need to be inclined with respect to the rotation direction, but may be, for example, orthogonal to the radial direction. Alternatively, the wall surface may be formed in a tapered shape or a step shape. Further, the plurality of dynamic pressure generation mechanisms 15 of this first embodiment are formed by the inclined grooves 9 having the same width and the same length.

Further, as illustrated in FIG. 4A, a depth dimension L10 which is the recessed amount of the inclined groove 9 of this first embodiment is formed to 1 μm. In addition, the depth dimension L10 of the inclined groove 9 is preferably 1 μm to 10 μm. Further, a bottom surface of the inclined groove 9 is formed as a flat surface and is formed in parallel to the land portion 12, but does not prevent the flat surface from being provided with a fine recessed portion or being formed to be inclined with respect to the land portion 12. Further, each of the wall surface 9a and the side walls 9b and 9c of the inclined groove 9 is orthogonal to the bottom surface of the inclined groove 9 (see FIG. 2).

Figure 6C:
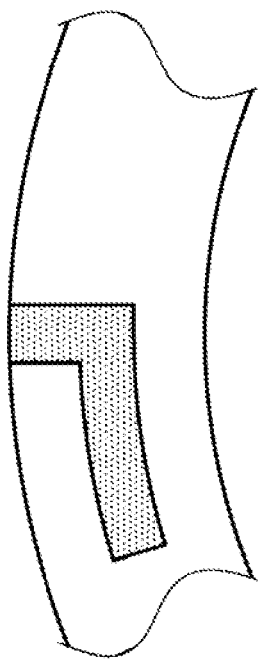
FIGS. 6A to 6D are partially enlarged views illustrating a modified example of dynamic pressure generation mechanisms of the sliding components according to the present invention.
Figure 6D:
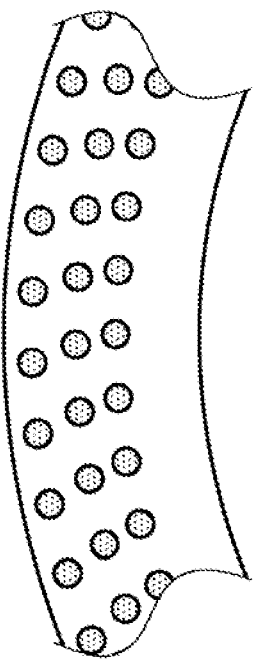
Figure 6A:
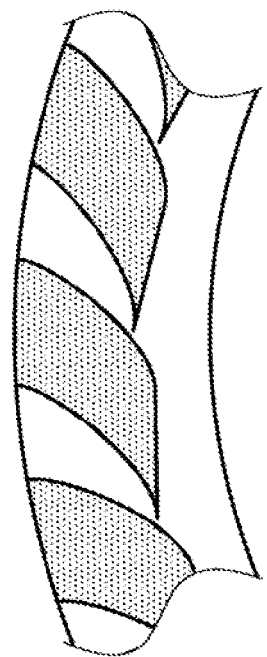
Figure 6B:
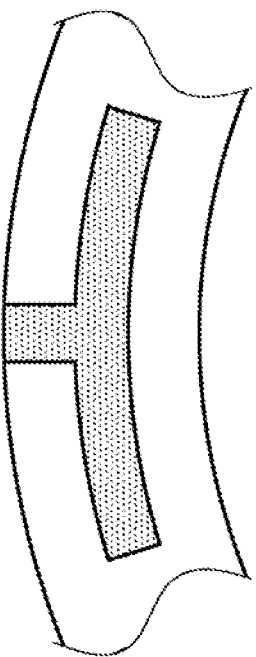

In addition, the dynamic pressure generation mechanism 15 is not limited to the inclined groove as in this first embodiment if the dynamic pressure generation mechanism is formed by the recessed portion which is recessed with respect to the land portion 12 in the sliding surface 11. For example, the recessed groove may be formed in other shapes such as a spiral shape having an arc side wall extending in a circumferential direction (see FIG. 6A) or an L shape (see FIG. 6B). Further, the dynamic pressure generation mechanism 15 may be formed by, for example, a recessed groove having a T shape (see FIG. 6C) and may be used regardless of the relative rotation direction of the stationary seal ring 10 and the rotating seal ring 20. Further, the dynamic pressure generation mechanism may be used regardless of the relative rotation direction by forming approximately half of the plurality of recessed grooves of FIGS. 2, 6A, and 6B in the direction opposite to the extension direction of the other recessed grooves. Furthermore, the dynamic pressure generation mechanism 15 may be formed by a recessed portion that does not communicate with any one of the atmosphere side and the side of the sealed liquid F as in a dimple shape (see FIG. 6D).

Figure 3:
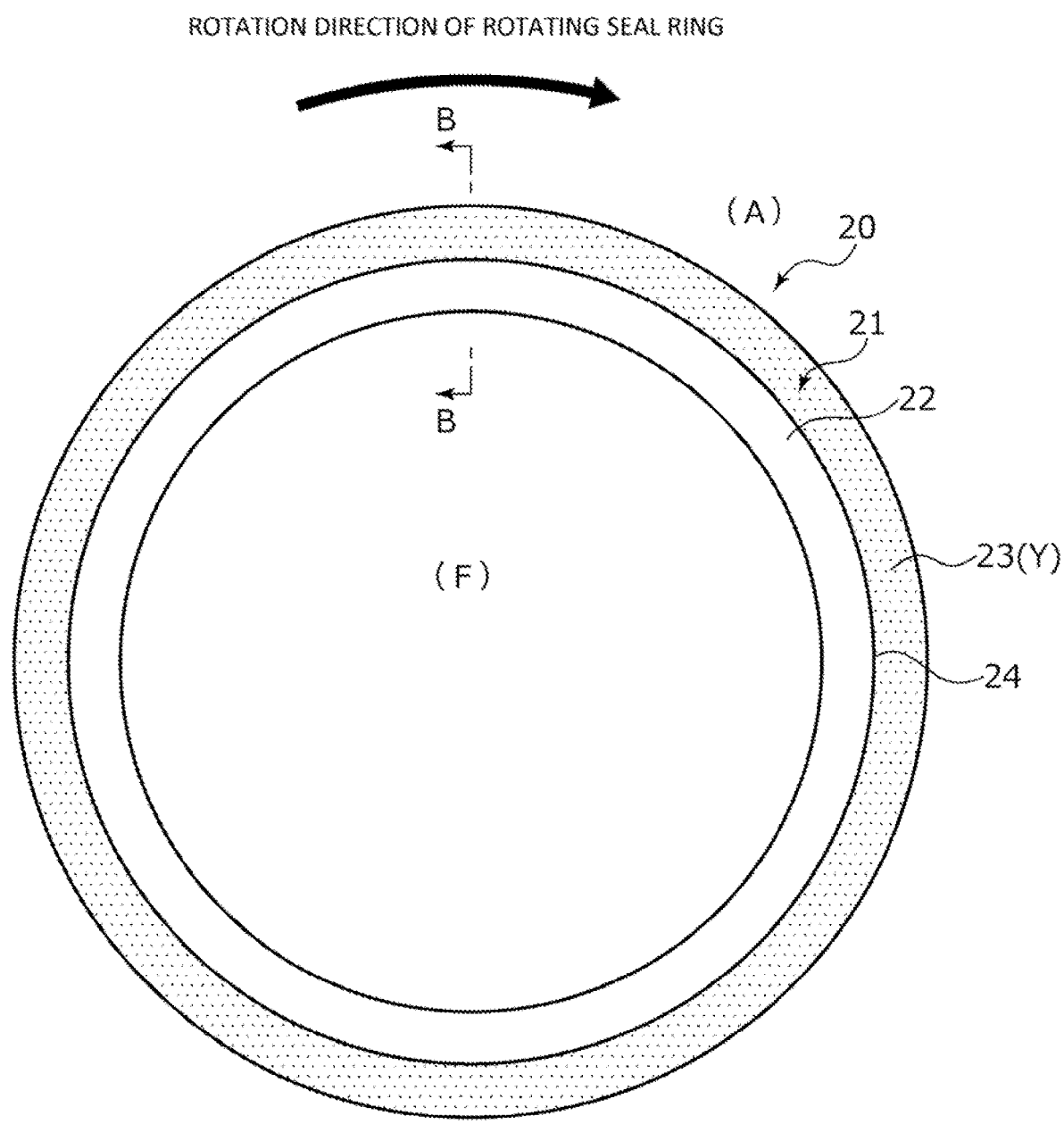
FIG. 3 is a view in which a sliding surface of a rotating seal ring in the first embodiment is viewed from the axial direction.
Figure 4:
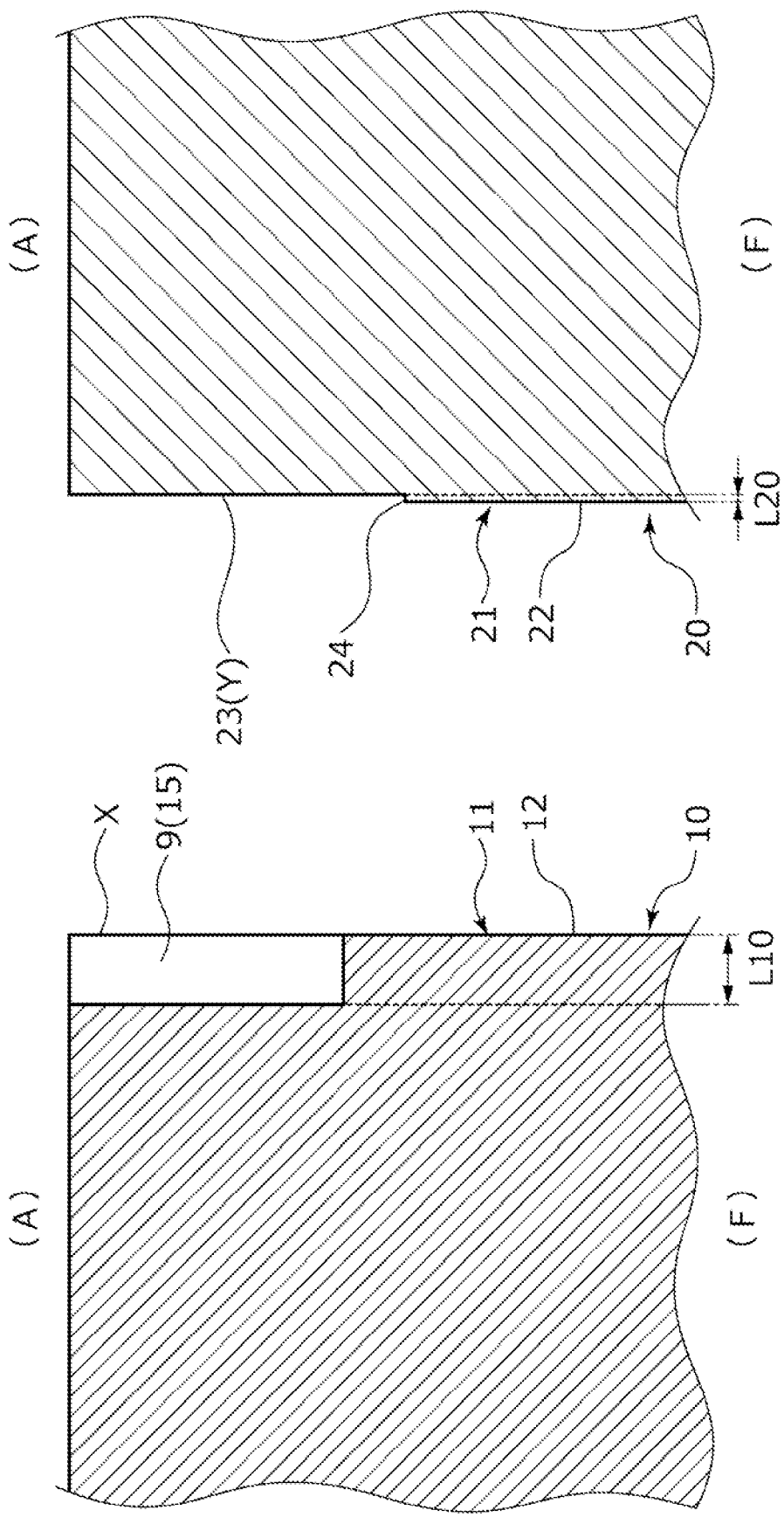
FIG. 4A is a cross-sectional view taken along a line A-A of FIG. 2
FIG. 4B is a cross-sectional view taken along a line B-B of FIG. 3.
Figure 5:
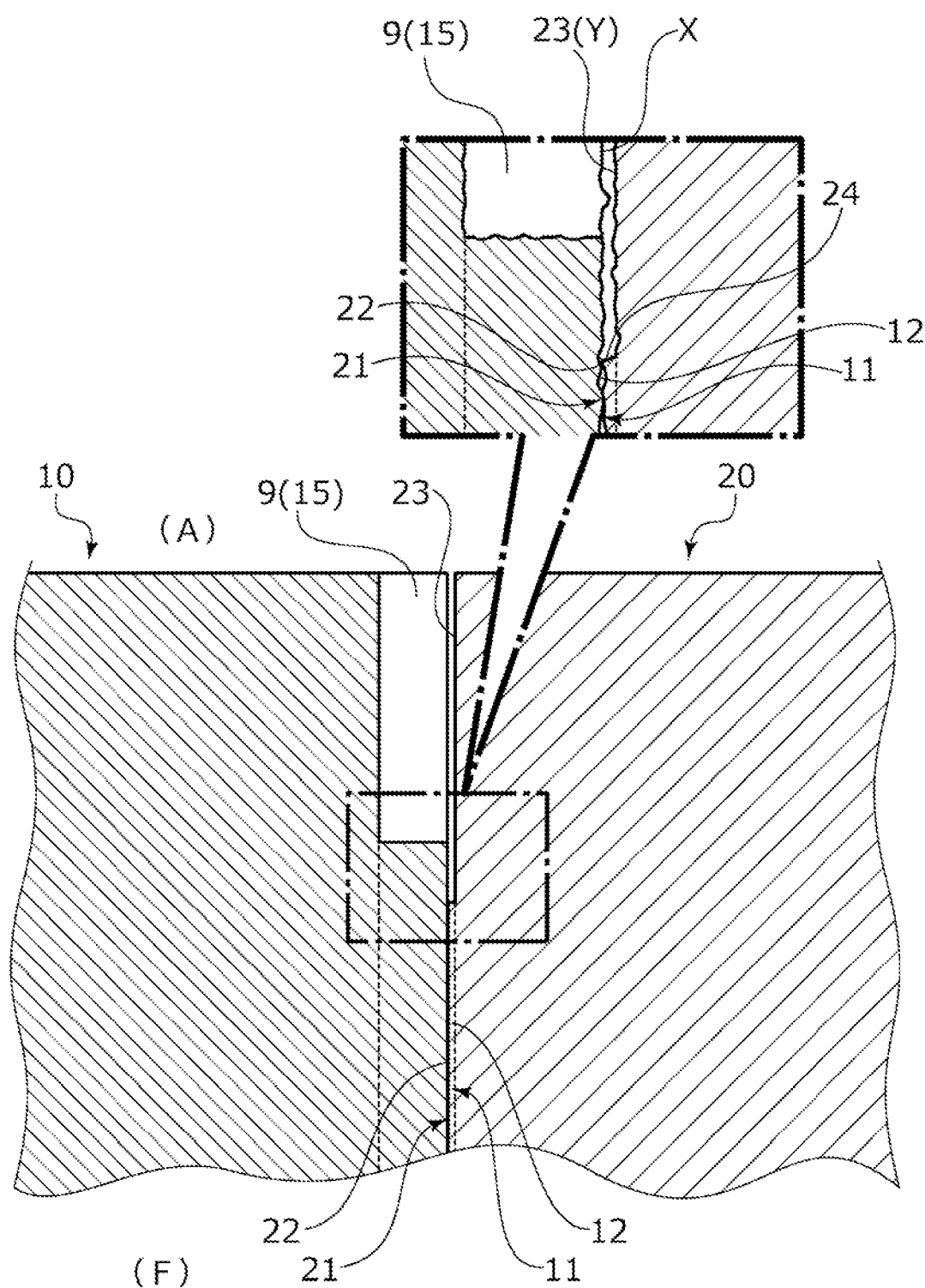
FIG. 5 is a cross-sectional view illustrating a state in which the sliding surface of the stationary seal ring is in contact with the sliding surface of the rotating seal ring in the first embodiment.

As illustrated in FIG. 3, in the rotating seal ring 20, the annular fine recess 23 of which the recessed amount with respect to the land portion 22 is smaller than that of the inclined groove 9 is formed on the outer radial side of the land portion 22 forming the flat surface on the inner radial portion of the sliding surface 21 and the step 24 is formed in the depth direction at the boundary portion between the land portion 22 and the fine recess 23 to have a circular shape when viewed from the axial direction, that is, a direction orthogonal to the sliding surface 21.

In the sliding surface 21 of the rotating seal ring 20, the fine recess 23 is formed in a surface region Y that faces a surface region X (see an enlarged portion of FIG. 2) in the periphery of the inclined groove 9 that constitutes the dynamic pressure generation mechanism 15 disposed in the sliding surface 11 of the stationary seal ring 10. Further, in this first embodiment, the fine recess 23 communicates with the atmosphere side and extends to correspond to a position on the outer radial side of the wall surface 9a of the inclined groove 9. That is, the step 24 which is the boundary portion between the land portion 22 and the fine recess 23 is formed to correspond to a position on the outer radial side of the wall surface 9a (see an enlarged portion in FIG. 2). In addition, the fine recess 23 does not need to extend to a corresponding position on the outer radial side of the wall surface 9a of the inclined groove 9 and may extend to a position corresponding to the wall surface 9a of the inclined groove 9 or a position on the inner radial side of the wall surface 9a of the inclined groove 9.

Further, as illustrated in FIG. 4B, a depth dimension L20 which is the recessed amount of the fine recess 23 of this first embodiment is formed to 0.1 μm. In addition, the depth dimension L20 of the fine recess 23 is smaller than the depth dimension L10 of the inclined groove 9 constituting the dynamic pressure generation mechanism 15 (L20<L10) and the depth dimension L20 is preferably formed to be ⅕ or less of the depth dimension L10 of the inclined groove 9. From another point of view, the fine recesses are preferably formed to be larger than waviness or fine protrusions on the surface of the land portion 12 of the sliding surface 11 of the stationary seal ring 10. Further, a bottom surface of the fine recess 23 is formed as a flat surface and is formed in parallel to the land portion 22, but does not prevent the flat surface from being provided with a fine recessed portion or from being formed to be inclined with respect to the land portion 22. Further, the step 24 is formed by the side surface orthogonal to the land portion 22, but may be formed by an inclined or curved side surface.

Next, an operation during the relative rotation of the stationary seal ring 10 and the rotating seal ring 20 will be described. First, when a general industrial machine is in a non-operation state in which the rotating seal ring 20 does not rotate, the sealed liquid F on the inner radial side of the sliding surfaces 11 and 21 slightly enters between the sliding surfaces 11 and 21 due to the capillary phenomenon and the sealed liquid F remaining during the stop of the general industrial machine and the atmosphere entering from the outer radial side of the sliding surfaces 11 and 21 are mixed in the dynamic pressure generation mechanism 15. In addition, since the sealed liquid F has higher viscosity than a gas, the leakage amount from the dynamic pressure generation mechanism 15 to the low pressure side during the stop of the general industrial machine is small.

When the rotating seal ring 20 relatively rotates with respect to the stationary seal ring 10 (see a black arrow of FIG. 2) in a case in which almost no sealed liquid F remains in the dynamic pressure generation mechanism 15 during the stop of the general industrial machine, a low pressure side fluid A on the atmosphere side is introduced from an opening on the low pressure side of the inclined groove 9 and the low pressure side fluid A follows in the rotation direction of the rotating seal ring 20 by the inclined groove 9, so that a dynamic pressure is generated in the inclined groove 9.

The pressure is highest in the vicinity of the wall surface 9a corresponding to one end of the inclined groove 9, that is, the closed end portion 9d and the low pressure side fluid A flows out from the closed end portion 9d to the periphery thereof. In addition, the pressure gradually decreases as it goes toward the opening on the low pressure side of the inclined groove 9. That is, the closed end portion 9d of the inclined groove 9 becomes a high pressure portion in which a high pressure is generated by the dynamic pressure in the inclined groove 9.

Further, when the stationary seal ring 10 and the rotating seal ring 20 rotate relative to each other, the high-pressure sealed liquid F flows from the inner radial side of the sliding surfaces 11 and 21 into between them at any time to perform so-called fluid lubrication. At this time, since the pressure of the sealed liquid F in the vicinity of the inclined groove 9 is particularly high at the closed end portion 9d of the inclined groove 9 as described above, almost no sealed liquid enters the inclined groove 9 while the sealed liquid remains at the annular portion of the land portion 12. On the other hand, the sealed liquid F in the vicinity of the opening on the low pressure side of the inclined groove 9 easily enters the inclined groove 9 since the inclined groove 9 communicates with the low pressure side.

Next, an operation in which the sealed liquid F sucked into the inclined groove 9 flows out between the sliding surfaces 11 and 21 will be described.

When the rotating seal ring 20 relatively rotates with respect to the stationary seal ring 10 (see a black arrow of FIG. 2), the sealed liquid F entering between the sliding surfaces 11 and 21 is sucked into the inclined groove 9 due to a relatively low pressure formed on the opening side of the inclined groove 9.

Then, the sealed liquid F sucked into the inclined groove 9 receives a large shearing force from the rotating seal ring 20, moves in the inclined groove 9 toward the wall surface 9a while increasing the pressure, and flows out from the closed end portion 9d to the land portion 12 in the periphery thereof.

Then, the amount of the sealed liquid F sucked into the inclined groove 9 increases and the sealed liquid F continuously flows out from the inclined groove 9 to a gap between the sliding surfaces 11 and 21 in a steady state. In the steady state, the high-pressure sealed liquid F flows from the inner radial side of the sliding surfaces 11 and 21 or the inclined groove 9 into between them at any time and the fluid lubrication is performed as described above. In addition, it is a transient short time from the initial stage of the relative rotation to the steady state through the low-speed rotation state. Further, since the interfacial tension on solids is larger in a liquid than a gas, the sealed liquid F is easily held between the sliding surfaces 11 and 21 and the atmosphere is easily discharged to the outer radial side of the stationary seal ring 10 and the rotating seal ring 20.

As described above, in the rotating seal ring 20 which relatively rotates with respect to the stationary seal ring 10, the surface region X in the periphery of the inclined groove 9 constituting the dynamic pressure generation mechanism 15 disposed in the sliding surface 11 of the stationary seal ring 10 is separated from the surface region Y of the sliding surface 21 of the facing rotating seal ring 20 by the annular fine recess 23. For that reason, particularly as illustrated in an enlarged portion of FIG. 5, since the annular fine recess 23 is provided in the sliding surface 21 of the rotating seal ring 20 in a state in which the land portion 12 of the sliding surface 11 of the stationary seal ring 10 and the land portion 22 of the sliding surface 21 of the rotating seal ring 20 slide on each other in a contact state or a non-contact state to be slightly separated from each other between the sliding surfaces 11 and 21 of the stationary seal ring 10 and the rotating seal ring 20 rotating relative to each other, the surface region X in the periphery of the inclined groove 9 constituting the dynamic pressure generation mechanism 15 disposed in the stationary seal ring 10, that is, the land portion 12 between the dynamic pressure generation mechanisms 15 disposed in the sliding surface 11 of the stationary seal ring 10 can be reliably in a non-contact state with respect to waviness or fine protrusions in the surface region Y of the sliding surface 21 of the facing rotating seal ring 20. Accordingly, it is possible to suppress the dynamic pressure generation mechanism 15 from being deformed and damaged due to the wear of the land portion 12 of the sliding surface 11 of the stationary seal ring 10 at the initial stage of the relative rotation of the rotating seal ring 20 with respect to the stationary seal ring 10 or during the low-speed rotation thereof.

Further, even in a steady state in which the sliding surfaces 11 and 21 are separated from each other by the dynamic pressure of the dynamic pressure generation mechanism 15 and are in a fluid lubrication state in which a fluid film is formed thereon, it is possible to suppress the dynamic pressure generation mechanism 15 from being deformed or damaged due to the wear of the land portion 12 of the sliding surface 11 of the stationary seal ring 10 based on the entrance of contamination and the like between the sliding surfaces 11 and 21 and to maintain the lubricity between the sliding surfaces 11 and 21.

Further, since the fine recess 23 is formed in the sliding surface 21 of the rotating seal ring 20 different from the sliding surface 11 of the stationary seal ring 10 in which the dynamic pressure generation mechanism 15 is disposed and the dynamic pressure generation mechanism 15 is surrounded by the land portion 12, a high pressure is easily caused by the dynamic pressure of the inclined groove 9 of the dynamic pressure generation mechanism 15. Further, since the inclined groove 9 can be formed in the sliding surface 11 of the stationary seal ring 10 and the fine recess 23 can be formed in the sliding surface 21 of the rotating seal ring 20, that is, the inclined groove and the fine recess can be formed in different seal rings, they can be easily processed.

Further, since the periphery of the closed end portion 9d which is the high pressure portion generating a high pressure by the dynamic pressure at the inclined groove 9 in the sliding surface 11 of the stationary seal ring 10 is the land portion 12 and the sealed liquid F can flow out into a region in which the land portion 12 of the stationary seal ring 10 and the land portion 22 of the rotating seal ring 20 which are closest to each other between the sliding surfaces 11 and 21 face each other, the sliding surfaces 11 and 21 can be stably separated from each other by a dynamic pressure.

Further, since the recessed portion constituting the dynamic pressure generation mechanism 15 is the inclined groove 9, it is possible to obtain a large pressure due to a long distance from the fluid inlet which is an outer radial side opening in the inclined groove 9 to the closed end portion 9d which is a high pressure portion generating a high dynamic pressure.

Further, the inclined groove 9 communicates with a low pressure side and the sealed liquid F is returned to a high pressure side by the dynamic pressure generation mechanism 15 so that the leakage of the sealed liquid F to the low pressure side can be reduced.

Furthermore, since a distance between the sliding surfaces 11 and 21 in the surface region X in the periphery of the inclined groove 9 constituting the dynamic pressure generation mechanism 15 disposed in the stationary seal ring 10 is longer than a distance between the sliding surfaces 11 and 21 in the region in which the land portion 22 of the rotating seal ring 20 faces the land portion 12 of the stationary seal ring 10 by the fine recess 23 formed in the sliding surface 21 of the rotating seal ring 20, it is possible to suppress the wear of the land portion 12 of the sliding surface 11 of the stationary seal ring 10 due to the entrance of contamination and the like mixed with the sealed liquid F returned to the high pressure side by the dynamic pressure generation mechanism 15. In addition, the sealed liquid F is returned to the high pressure side by the dynamic pressure generation mechanism 15 so that contamination and the like are likely to accumulate on the low pressure side between the sliding surfaces 11 and 21. However, since a distance between the sliding surfaces 11 and 21 on the low pressure side provided with the dynamic pressure generation mechanism 15 is widened by the fine recess 23, the accumulation of contamination and the like can be allowed and the wear of the sliding surfaces 11 and 21 can be suppressed.

Second Embodiment

Next, A pair of sliding components according to a second embodiment of the present invention will be described with reference to FIGS. 7 to 9. In addition, a description for the overlapping configuration in the same configuration as that of the first embodiment will be omitted.

Figure 7:
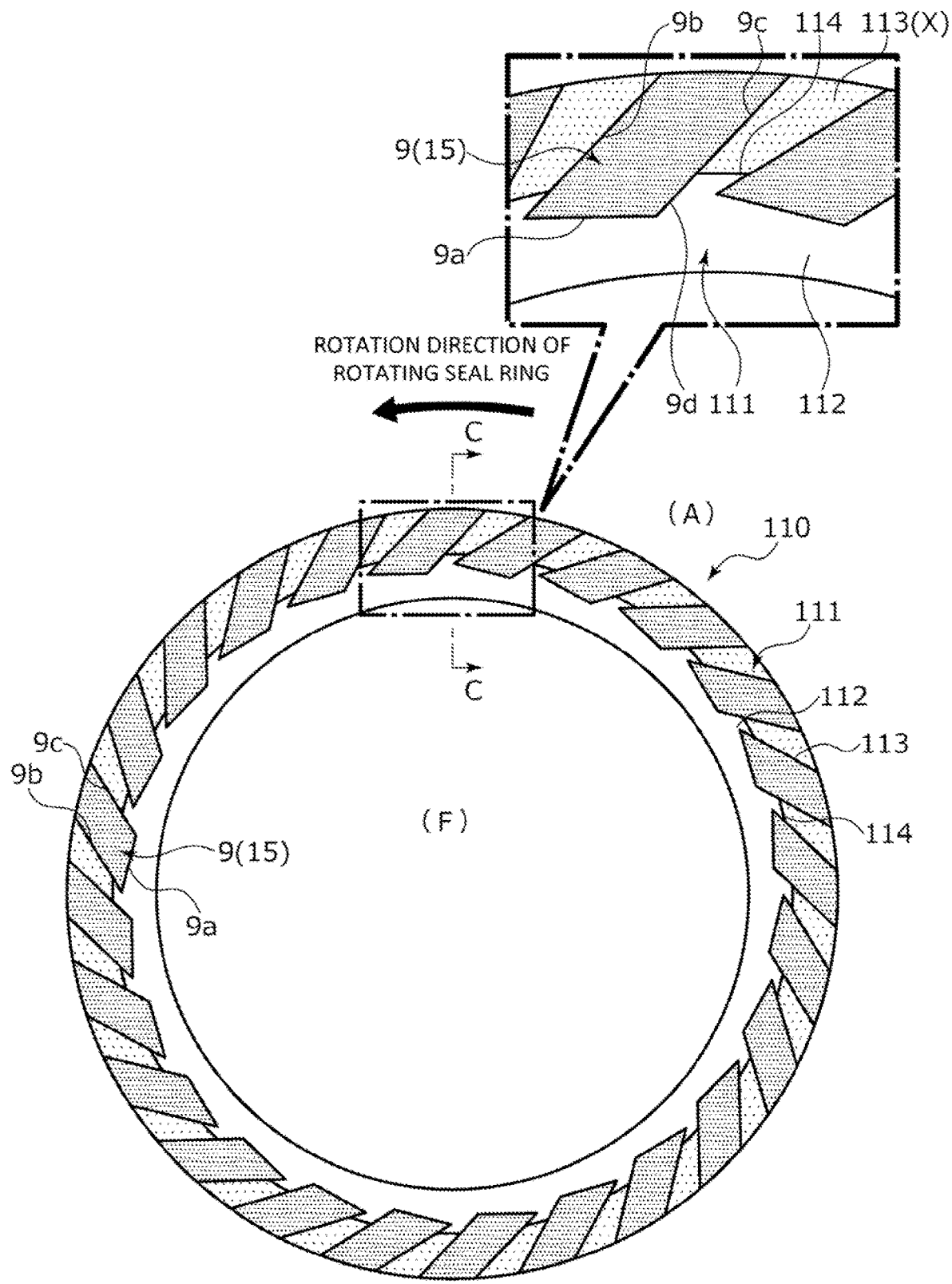
FIG. 7 is a view in which a sliding surface of a stationary seal ring of the sliding components according to a second embodiment of the present invention is viewed from the axial direction.

As illustrated in FIG. 7, the plurality of dynamic pressure generation mechanisms 15 are arranged at equal intervals in a sliding surface 111 of a stationary seal ring 110 in the circumferential direction of the stationary seal ring 110. In a portion other than the dynamic pressure generation mechanism 15 in the sliding surface 111, a land portion 112 which is a flat surface is provided on the inner radial side of the periphery of the wall surface 9a of the inclined groove 9 constituting the dynamic pressure generation mechanism 15 and a fine recess 113 which is slightly recessed from the land portion 112 is provided on the outer radial side of the land portion 112. That is, the dynamic pressure generation mechanisms 15 are connected to each other by the fine recess 113 over the entire circumference of the sliding surface 111. Further, the closed end portion 9d which is the high pressure portion generating a high pressure by the dynamic pressure in the inclined groove 9 is surrounded by the land portion 112 and an outer radial side of the closed end portion 9d of the inclined groove 9 is surrounded by the fine recess 113. In addition, a sliding surface 121 of a rotating seal ring 120 is formed as a flat surface and a recessed portion is not provided in the flat surface.

Further, the fine recess 113 is provided in the sliding surface 111 of the stationary seal ring 110 to communicate with the atmosphere side and to extend to a corresponding position on the outer radial side of the wall surface 9a of the inclined groove 9. That is, a step 114 which is a boundary portion between the land portion 112 and the fine recess 113 is formed to correspond to the outer radial side position of the wall surface 9a. Further, the land portion 112 is formed such that the radial portions respectively formed between the inner radial side annular portion not provided with the dynamic pressure generation mechanism 15 and the dynamic pressure generation mechanism 15 are continuous to each other in the sliding surface 111 of the stationary seal ring 110. In addition, the fine recess 113 does not need to extend to correspond to the outer radial side position of the wall surface 9a of the inclined groove 9, but may extend to a position corresponding to the wall surface 9a of the inclined groove 9 or a position on the inner radial side of the wall surface 9a of the inclined groove 9.

Figure 8:
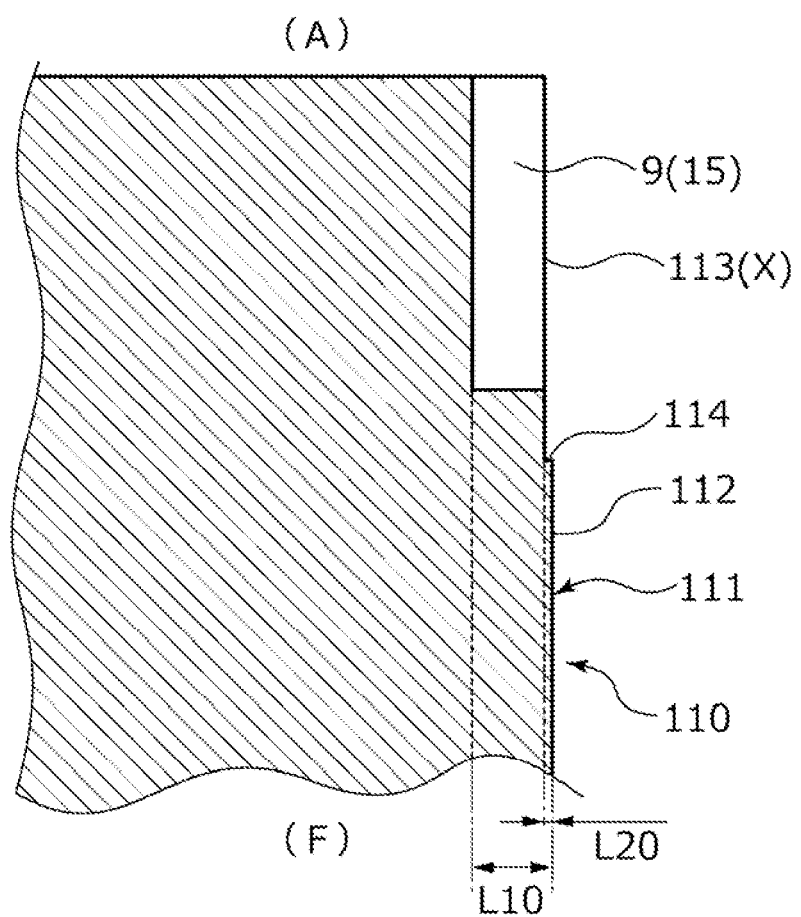
FIG. 8 is a cross-sectional view taken along a line C-C of FIG. 6.
Figure 9:
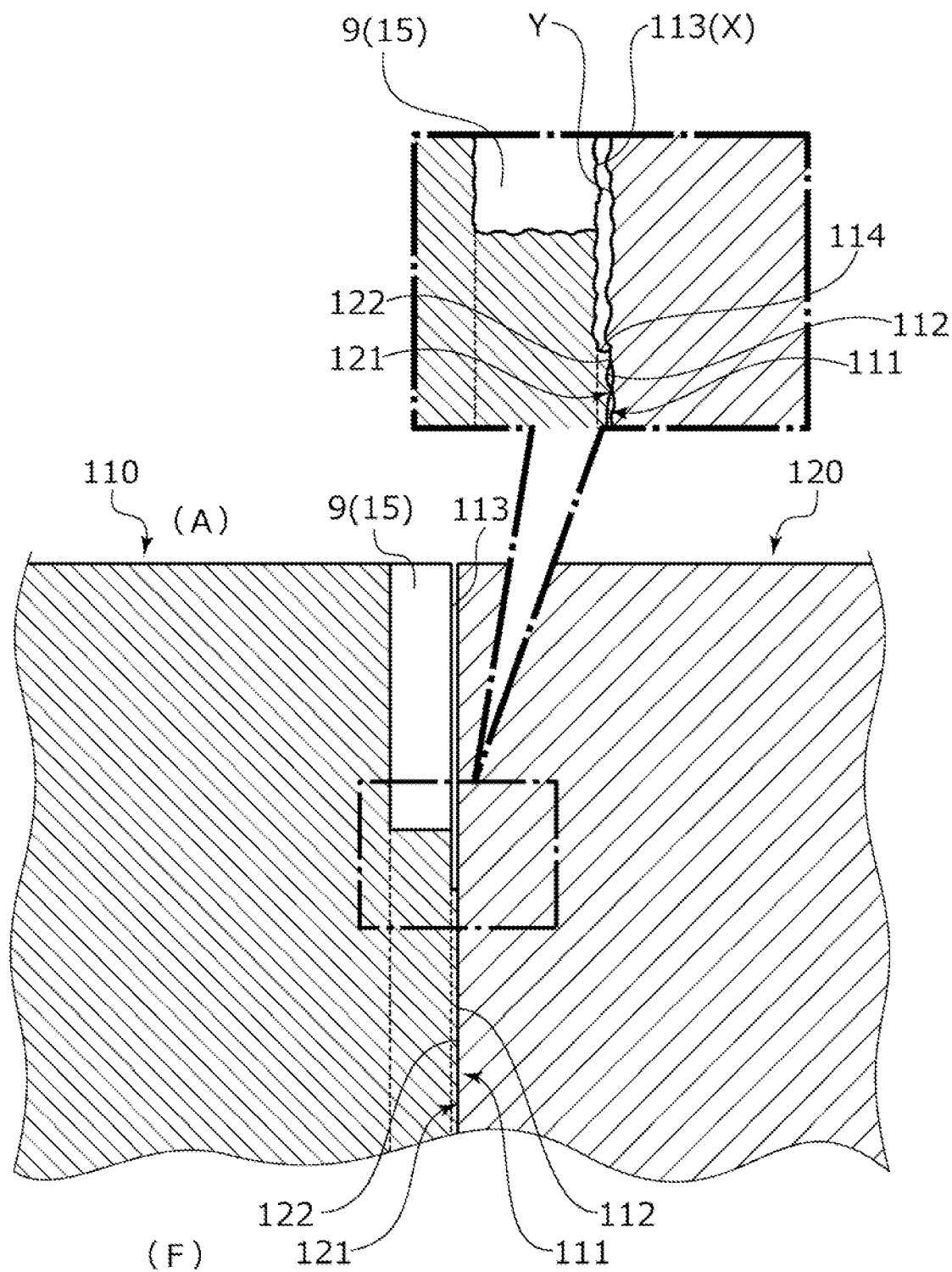
FIG. 9 is a cross-sectional view illustrating a state in which the sliding surface of the stationary seal ring is in contact with a sliding surface of a rotating seal ring in the second embodiment.

Further, as illustrated in FIG. 8, a depth dimension L10 of the inclined groove 9 of this second embodiment is formed to 1 μm and a depth dimension L20 of the fine recess 23 is formed to 0.1 μm.

In this way, in the stationary seal ring 110, the surface region X in the periphery of the inclined groove 9 constituting the dynamic pressure generation mechanism 15 is separated from the surface region Y of the sliding surface 121 of the facing rotating seal ring 120 by the fine recess 113. Therefore, particularly as illustrated in an enlarged portion of FIG. 9, since the fine recess 113 is provided in the sliding surface 111 of the stationary seal ring 110 in a state in which the land portion 112 of the sliding surface 111 of the stationary seal ring 110 and the land portion 122 of the sliding surface 121 of the rotating seal ring 120 slide on each other in a contact state or a non-contact state to be slightly separated from each other between the sliding surfaces 111 and 121 of the stationary seal ring 110 and the rotating seal ring 120 rotating relative to each other, the surface region X in the periphery of the inclined groove 9 can be reliably in a non-contact state with respect to waviness or fine protrusions in the surface region Y of the sliding surface 121 of the facing rotating seal ring 120. Accordingly, it is possible to reliably suppress the dynamic pressure generation mechanism 15 from being deformed and damaged due to the wear of the sliding surface 111 of the stationary seal ring 110 and to maintain the lubricity between the sliding surfaces 111 and 121.

Further, since the fine recess 113 and the inclined groove 9 are formed on the sliding surface 111 of the same stationary seal ring 110, it is possible to generate a desired dynamic pressure without shifting the relative position between the fine recess 113 and the inclined groove 9 during the relative rotation of the stationary seal ring 110 and the rotating seal ring 120 and to reliably suppress the dynamic pressure generation mechanism 15 from being deformed and damaged due to the wear of the sliding surface 111 of the stationary seal ring 110. In addition, the dynamic pressure generation mechanisms 15 may not be connected to each other by the fine recess 113 over the entire circumference of the sliding surface 111 and a part of them may not be connected to each other.

Third Embodiment

Figure 10:
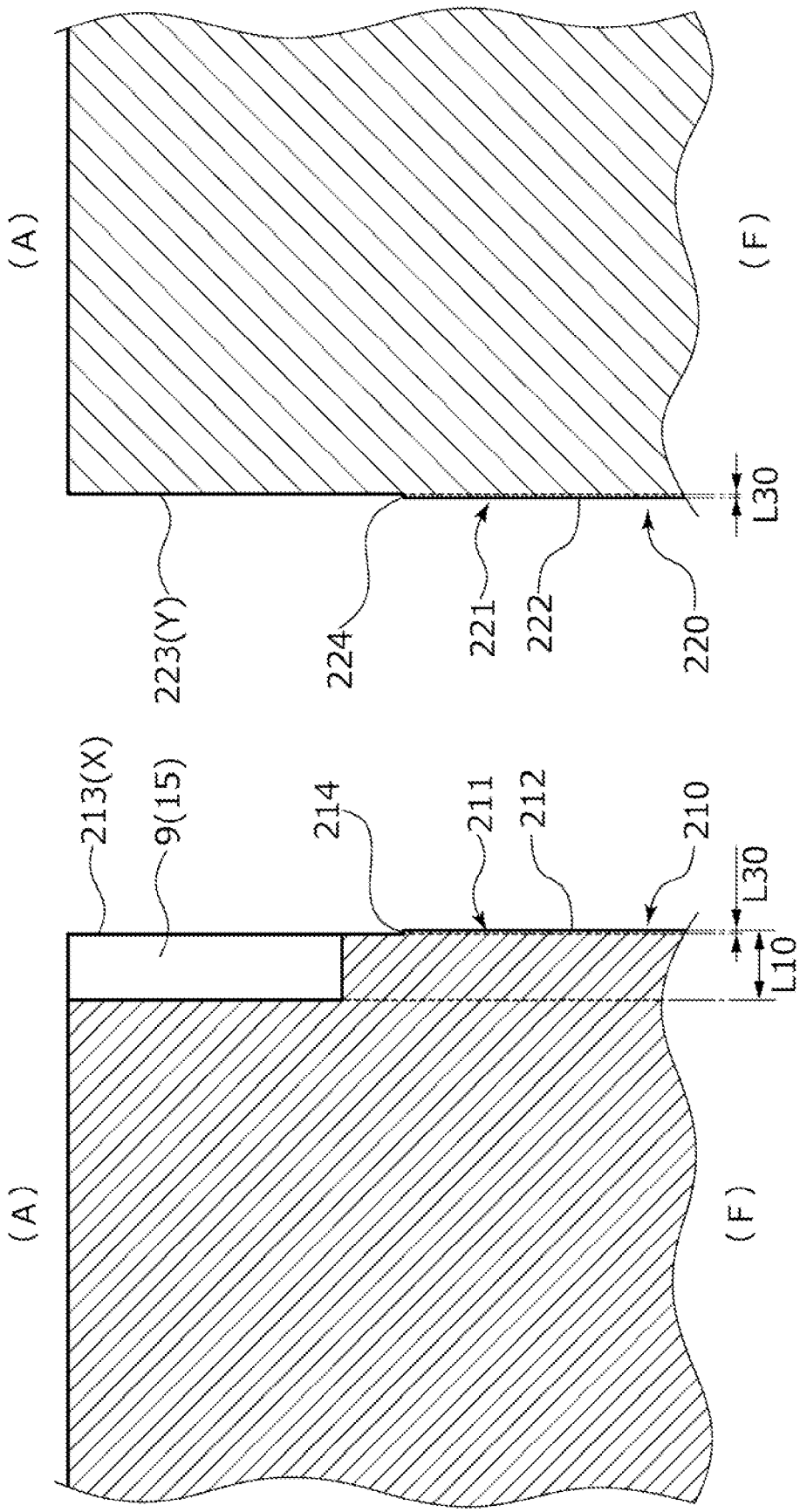
FIG. 10A is a cross-sectional view of a sliding surface of a stationary seal ring of sliding components according to a third embodiment of the present invention and FIG. 10B is a cross-sectional view of a sliding surface of a rotating seal ring in the third embodiment.
Figure 11:
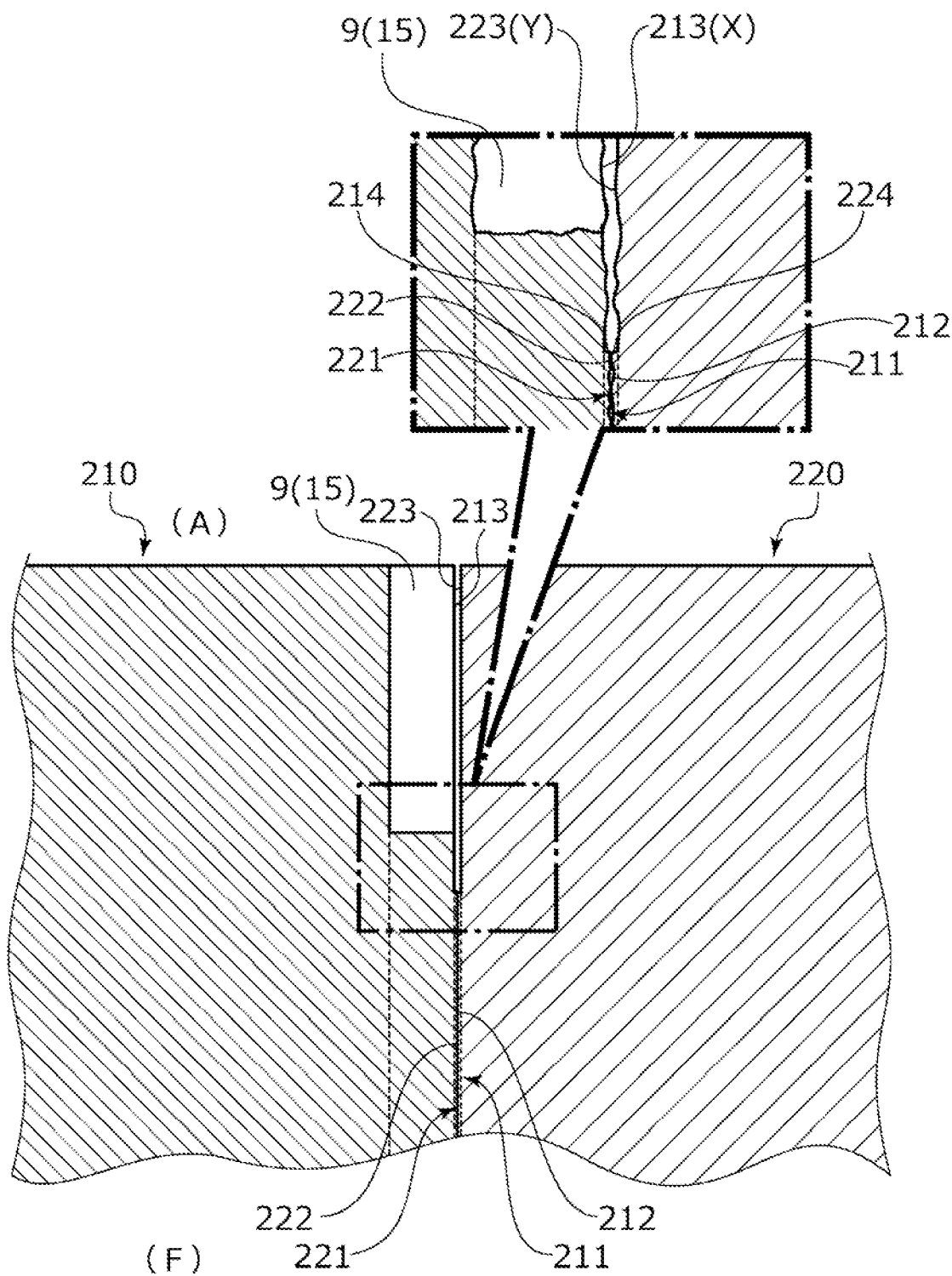
FIG. 11 is a cross-sectional view illustrating a state in which the sliding surface of the stationary seal ring is in contact with the sliding surface of the rotating seal ring in the third embodiment.

Next, a pair of sliding components according to a third embodiment of the present invention will be described with reference to FIGS. 10 and 11. In addition, a description for the overlapping configuration in the same configuration as that of the second embodiment will be omitted.

As illustrated in FIG. 10A, the plurality of dynamic pressure generation mechanisms 15 are arranged at equal intervals in a sliding surface 211 of a stationary seal ring 210 in the circumferential direction of the stationary seal ring 210. In a portion other than the dynamic pressure generation mechanism 15 in the sliding surface 211, a land portion 212 which is a flat surface is provided on the inner radial side of the periphery of the wall surface 9a of the inclined groove 9 constituting the dynamic pressure generation mechanism 15, a fine recess 213 which is slightly recessed from the land portion 212 is provided on the outer radial side of the land portion 212, and a step 214 is formed in the depth direction at the boundary portion between the land portion 212 and the fine recess 213. That is, the surface region X in the periphery of the inclined groove 9 constituting the dynamic pressure generation mechanism 15 is provided with the fine recess 213.

Further, a depth dimension L10 which is the recessed amount of the inclined groove 9 of this third embodiment is formed to 1 μm and a depth dimension L30 which is the recessed amount of the fine recess 213 is formed to 0.05 μm. In addition, a depth dimension L30 of the fine recess 213 is smaller than a depth dimension L10 of the inclined groove 9 constituting the dynamic pressure generation mechanism 15 (L30<L10) and the depth dimension L30 is preferably formed to be ⅕ or less of the depth dimension L10 of the inclined groove 9. From still another point of view, the fine recess is preferably formed to be larger than waviness or fine protrusions of a surface of a land portion 222 of a sliding surface 221 of a rotating seal ring 220.

As illustrated in FIG. 10B, in the rotating seal ring 220, an annular fine recess 223 of which the recessed amount with respect to the land portion 222 is smaller than that of the inclined groove 9 is formed on the outer radial side of the land portion 222 forming the flat surface on the inner radial portion of the sliding surface 221 and a step 224 is formed in the depth direction at the boundary portion between the land portion 222 and the fine recess 223. That is, the surface region Y facing the surface region X in the periphery of the inclined groove 9 constituting the dynamic pressure generation mechanism 15 is provided with the fine recess 223.

Further, the depth dimension L30 which is the recessed amount of the fine recess 223 of this third embodiment is formed to the same recessed amount as the fine recess 213 formed in the stationary seal ring 210. In addition, the fine recess 213 formed in the stationary seal ring 210 and the fine recess 223 formed in the rotating seal ring 220 may have a different recessed amount.

In this way, in the stationary seal ring 210, the surface region X in the periphery of the inclined groove 9 constituting the dynamic pressure generation mechanism 15 is separated from the surface region Y of the sliding surface 121 of the facing rotating seal ring 120 by the fine recesses 213 and 223. For that reason, particularly as illustrated in an enlarged portion of FIG. 11, since the fine recess 213 of the sliding surface 211 of the stationary seal ring 210 and the fine recess 223 of the sliding surface 221 of the rotating seal ring 220 are respectively provided to face each other in a state in which the land portion 212 of the sliding surface 211 of the stationary seal ring 210 and the land portion 222 of the sliding surface 221 of the rotating seal ring 220 slide on each other in a contact state or a non-contact state to be slightly separated from each other between the sliding surfaces 211 and 221 of the stationary seal ring 210 and the rotating seal ring 220 rotating relative to each other, the surface region X in the periphery of the inclined groove 9 can be reliably in a non-contact state with respect to waviness or fine protrusions in the surface region Y of the sliding surface 221 of the facing rotating seal ring 220. Accordingly, it is possible to reliably suppress the dynamic pressure generation mechanism 15 from being deformed and damaged due to the wear of the sliding surface 211 of the stationary seal ring 210 and to maintain the lubricity between the sliding surfaces 211 and 221.

Fourth Embodiment

Next, a pair of sliding components according to a fourth embodiment of the present invention will be described with reference to FIG. 12. In addition, a description for the overlapping configuration in the same configuration as that of the second embodiment will be omitted.

Figure 12:
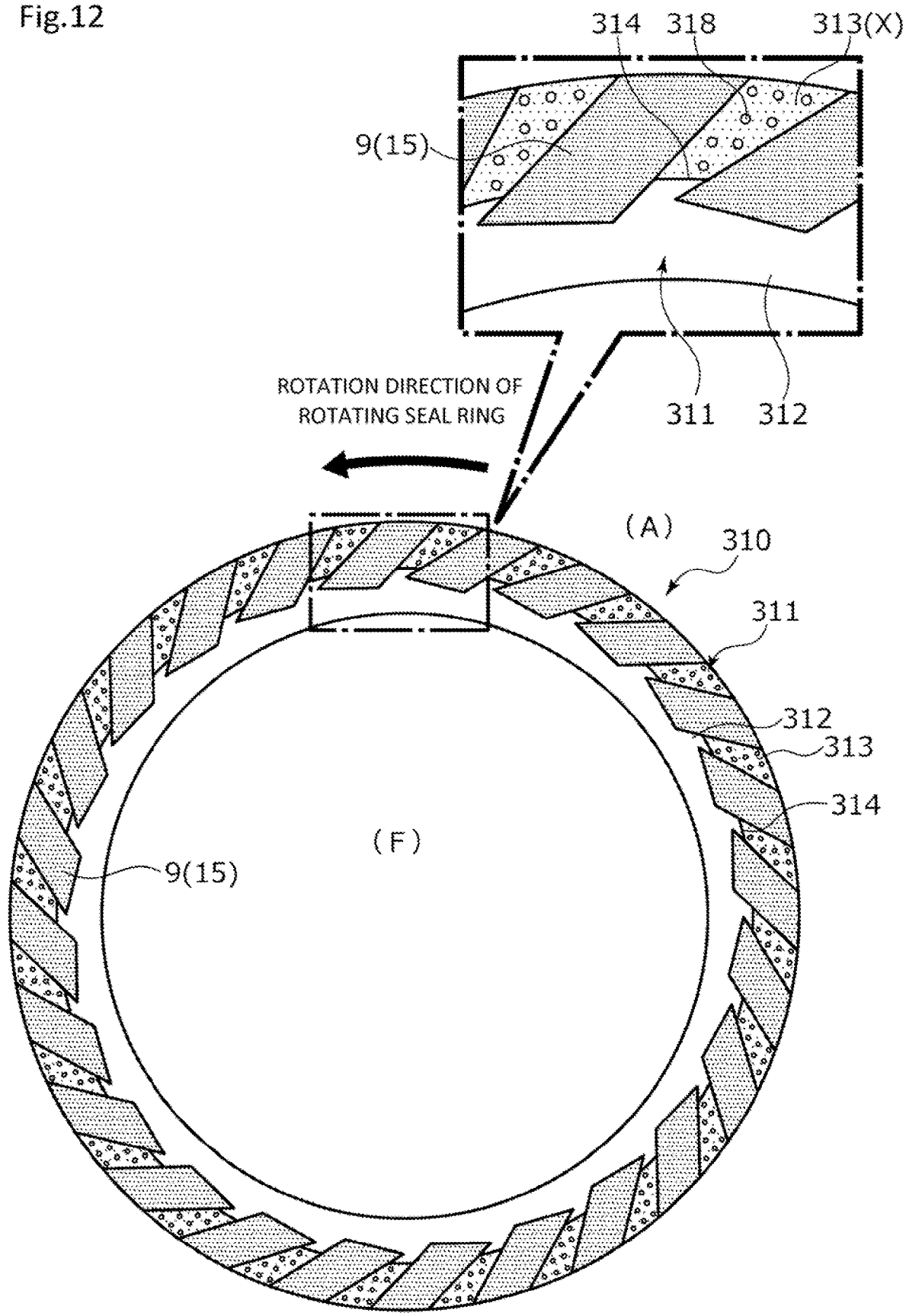
FIG. 12 is a view in which a sliding surface of a stationary seal ring of sliding components according to a fourth embodiment of the present invention is viewed from the axial direction.

As illustrated in FIG. 12, the stationary seal ring 310 is provided with a plurality of independent land portions 318 surrounded by the fine recess 313 formed between the adjacent dynamic pressure generation mechanisms 15. That is, the independent land portion 318 is separated from the inclined groove 9 in the sliding surface 311 of the stationary seal ring 310. Further, in the sliding surface 311 of the stationary seal ring 310, the independent land portion 318 is formed to be flush with the land portion 312 formed on the inner radial side. In addition, in this fourth embodiment, the independent land portion 318 is formed in a circular shape when viewed from the axial direction, but the present invention is not limited thereto. For example, the independent land portion may be formed in other shapes such as rectangular or linear shapes. Further, the plurality of independent land portions 318 are formed in the fine recess 313, but one independent land portion 318 may be formed between the adjacent dynamic pressure generation mechanisms 15.

In this way, the stationary seal ring 310 is provided with the plurality of independent land portions 318 surrounded by the fine recess 313 formed between the adjacent dynamic pressure generation mechanisms 15. For that reason, since the fine recess 313 is provided in the sliding surface 311 of the stationary seal ring 310 in a state in which the land portion 312 and the independent land portion 318 of the sliding surface 311 of the stationary seal ring 310 slide on the land portion 122 of the sliding surface 121 of the rotating seal ring 120 in a contact state or a non-contact state to be slightly separated from each other between the sliding surfaces 311 and 121 of the stationary seal ring 310 and the rotating seal ring 120 rotating relative to each other, the surface region X in the periphery of the inclined groove 9 constituting the dynamic pressure generation mechanism 15 can be reliably in a non-contact state with respect to waviness or fine protrusions in the surface region Y of the sliding surface 121 of the facing rotating seal ring 120. Accordingly, it is possible to reliably suppress the dynamic pressure generation mechanism 15 from being deformed and damaged due to the wear of the sliding surface 311 of the stationary seal ring 310.

Further, it is possible to receive the sliding torque between the sliding surfaces 311 and 121 in a well balanced manner by increasing the sliding area with respect to the sliding surface 121 of the rotating seal ring 120 also in the surface region X in the periphery of the inclined groove 9 constituting the dynamic pressure generation mechanism 15 by the independent land portion 318.

In addition, in this fourth embodiment, the independent land portion 318 may be in contact with the land portion 312 formed on the inner radial side of the sliding surface 311 if the independent land portion is surrounded by the fine recess 313 and separated from the inclined groove 9.

Fifth Embodiment

Next, a pair of sliding components according to a fifth embodiment of the present invention will be described with reference to FIG. 13. In addition, a description for the overlapping configuration in the same configuration as that of the second embodiment will be omitted.

Figure 13:
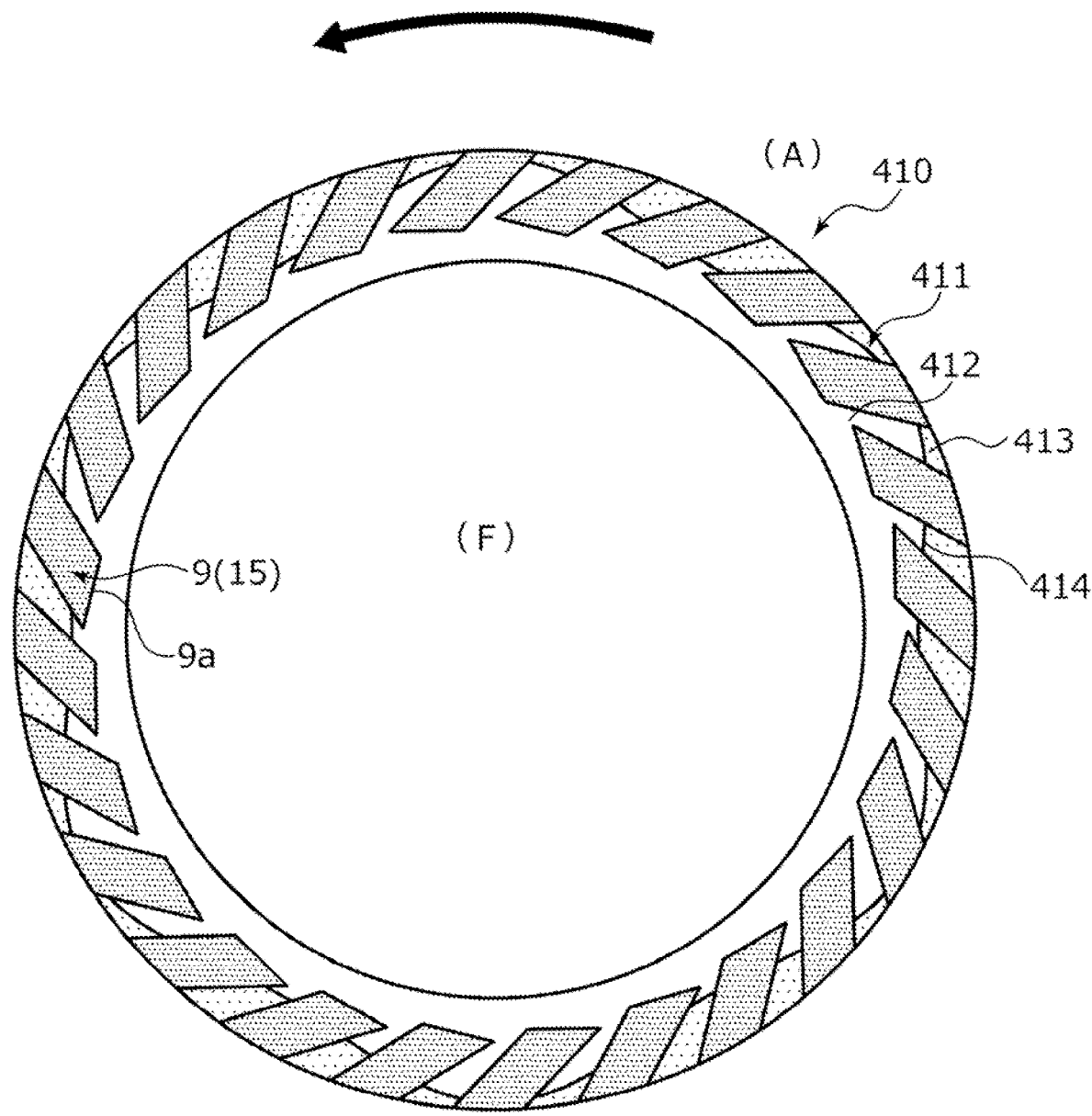
FIG. 13 is a view in which a sliding surface of a stationary seal ring of sliding components according to a fifth embodiment of the present invention is viewed from the axial direction.

As illustrated in FIG. 13, the plurality of dynamic pressure generation mechanisms 15 are arranged at equal intervals in a sliding surface 411 of a stationary seal ring 410 in the circumferential direction of the stationary seal ring 410. In a portion other than the dynamic pressure generation mechanism 15 in the sliding surface 411, a land portion 412 which is a flat surface is provided on the inner radial side of the periphery of the wall surface 9a of the inclined groove 9 constituting the dynamic pressure generation mechanism 15 and a fine recess 413 of which the recessed amount with respect to the land portion 412 is smaller than that of the inclined groove 9 is provided on the outer radial side of the land portion 412. Further, a step 414 which is formed in the depth direction at the boundary portion between the land portion 412 and the fine recess 413 is formed to be separated in a waveform when viewed from the axial direction.

In this way, in the stationary seal ring 410, the boundary portion between the land portion 412 and the fine recess 413 in the sliding surface 411 is formed to be disposed separately in a waveform when viewed from the axial direction and the land portion 412 and the fine recess 413 are alternately arranged in the sliding surface 411 in the circumferential direction. Accordingly, it is possible to obtain both the lubricity between the sliding surfaces 411 and 121 and the sliding torque therebetween at the same time.

In addition, in this fifth embodiment, the fine recess 413 is formed in the sliding surface 411 of the stationary seal ring 410 provided with the dynamic pressure generation mechanism 15, but as in the first embodiment, the boundary portion between the land portion and the fine recess may be continuously formed without interruption in the circumferential direction to have a waveform when viewed from the axial direction in the sliding surface of the rotating seal ring. Further, the waveform of the boundary portion between the land portion 412 and the fine recess 413 may be various waveforms such as a sine wave and a triangular wave or another shape such as a stepped shape. Further, the independent land portion which is surrounded by the fine recess as in the fourth embodiment may be formed between the adjacent dynamic pressure generation mechanisms 15.

Sixth Embodiment

Next, a pair of sliding components according to a sixth embodiment of the present invention will be described with reference to FIG. 14. In addition, a description for the overlapping configuration in the same configuration as that of the first embodiment will be omitted.

Figure 14A:
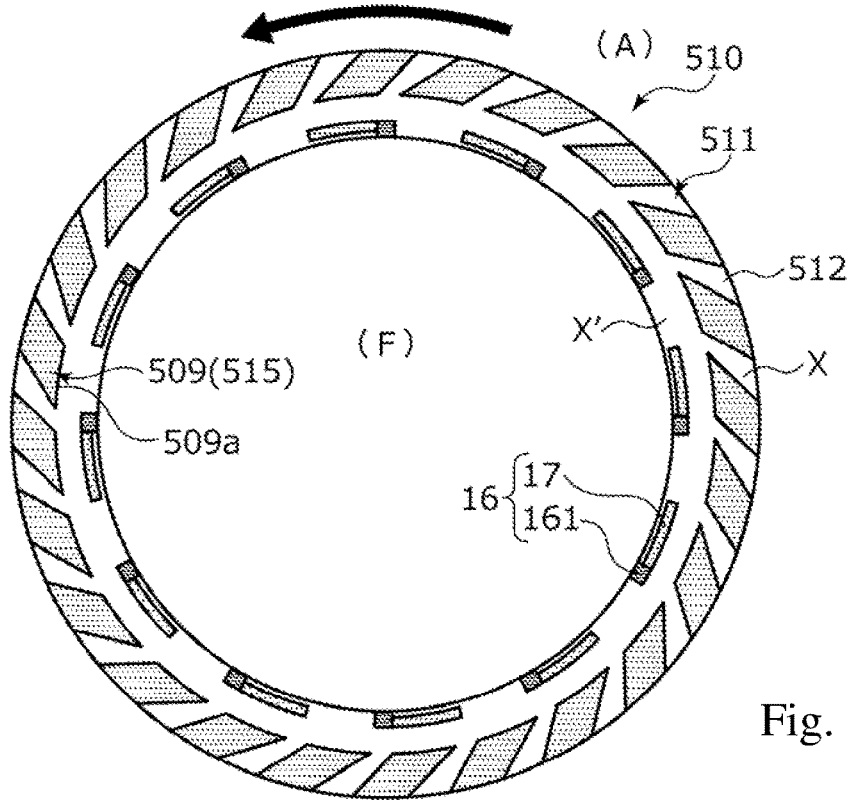
FIG. 14A is a view in which a sliding surface of a stationary seal ring of sliding components according to a sixth embodiment of the present invention is viewed from the axial direction and FIG. 14B is a view in which a sliding surface of a rotating seal ring in the sixth embodiment is viewed from the axial direction.

As illustrated in FIG. 14A, a plurality of specific dynamic pressure generation mechanisms 16 and a plurality of dynamic pressure generation mechanisms 515 formed by inclined grooves 509 are formed in a sliding surface 511 of a stationary seal ring 510. In addition, a side surface which extends in the circumferential direction on the inner radial side of the inclined groove 509 is located on the same circumference. The specific dynamic pressure generation mechanism 16 includes a liquid guide groove portion 161 which serves as a recessed portion and a recessed groove communicating with the side of the sealed liquid F corresponding to the high pressure side and a Rayleigh step 17 which serves as a recessed portion and a recessed groove extending in the circumferential direction to be concentric with the stationary seal ring 510 in a counter-clockwise direction of the dawning paper from the outer radial side end portion of the liquid guide groove portion 161. In addition, the liquid guide groove portion 161 is a deep groove and the Rayleigh step 17 is a shallow groove. Further, a portion other than the specific dynamic pressure generation mechanism 16 and the dynamic pressure generation mechanism 515 of the sliding surface 511 is a land portion 512 which is formed as a flat surface.

Figure 14B:
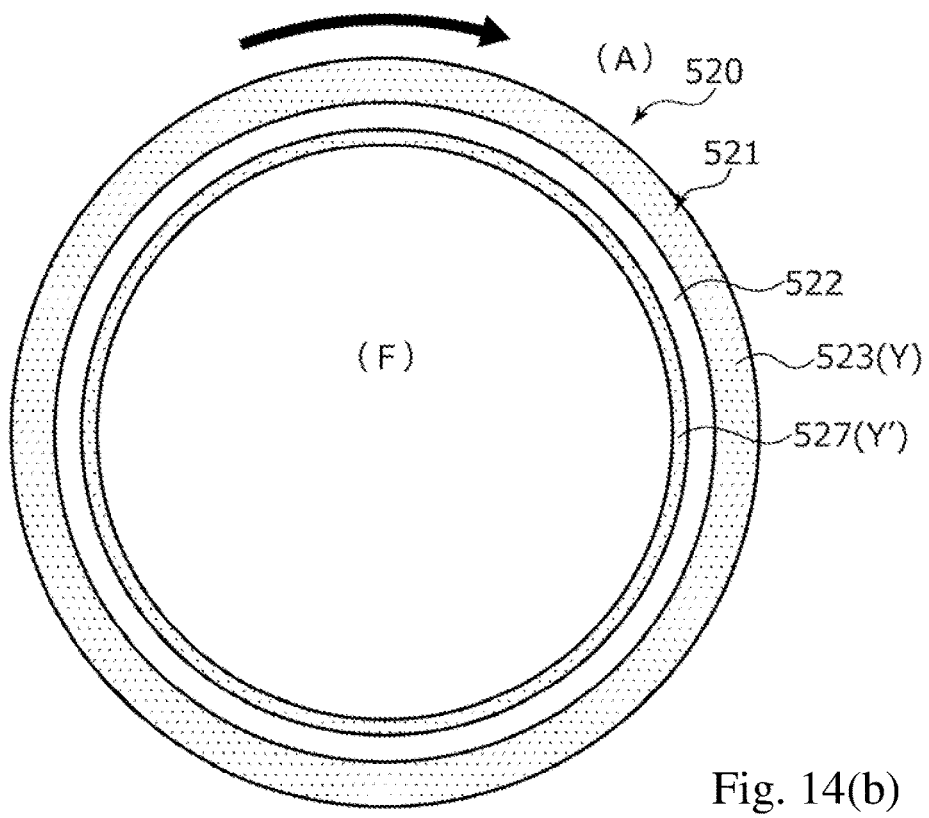

As illustrated in FIG. 14B, a sliding surface 521 of a rotating seal ring 520 is provided with a fine recess 523 which is formed on the outer radial side of a land portion 522 formed as a flat surface so that the recessed amount with respect to the land portion 522 is smaller than that of the inclined groove 509 or the Rayleigh step 17 and a fine recess 527 of which the recessed amount is the same as that of the fine recess 523 is provided on the inner radial side of the land portion 522. In addition, the fine recesses 523 and 527 may be formed to have a different recessed amount if the recessed amount with respect to the land portion 522 is smaller than that of the inclined groove 509 or the Rayleigh step 17.

In the sliding surface 521 of the rotating seal ring 520, the outer radial side fine recess 523 is formed in the surface region Y facing the surface region X in the periphery of the inclined groove 509 constituting the dynamic pressure generation mechanism 515 disposed in the sliding surface 511 of the stationary seal ring 510. Further, in this sixth embodiment, the outer radial side fine recess 523 communicates with the atmosphere side and extends to a position corresponding to the wall portion 509a of the inclined groove 509 and the boundary portion between the land portion 522 and the fine recess 523 is formed in a circular shape when viewed from the axial direction.

In the sliding surface 521 of the rotating seal ring 520, the inner radial side fine recess 527 is formed in a surface region Y' facing a surface region X' in the periphery of the Rayleigh step 17 and the liquid guide groove portion 161 constituting the specific dynamic pressure generation mechanism 16 disposed in the sliding surface 511 of the stationary seal ring 510. Further, in this sixth embodiment, the inner radial side fine recess 527 communicates with the side of the sealed liquid F and extends to a position corresponding to the outer radial side wall of the Rayleigh step 17 and the outer radial side end portion of the liquid guide groove portion 161 and the boundary portion between the land portion 522 and the fine recess 527 is formed in a circular shape when viewed from the axial direction.

When the rotating seal ring 520 relatively rotates in the counter-clockwise direction of the drawing paper of FIG. 14A, the sealed liquid F moves so that a dynamic pressure is generated in the Rayleigh step 17.

In this way, it is possible to collect the sealed liquid F that tends to leak from the sliding surface 511 to the low pressure side by the dynamic pressure generation mechanism 515 while generating an appropriate liquid film by separating the sliding surfaces 511 and 521 by the dynamic pressure generated in the specific dynamic pressure generation mechanism 16. In addition, in the rotating seal ring 520 relatively rotating with respect to the stationary seal ring 510, the surface regions Y and Y' facing the surface regions X and X' in the periphery of the specific dynamic pressure generation mechanism 16 and the dynamic pressure generation mechanism 515 disposed in the stationary seal ring 510 are respectively provided with the fine recesses 523 and 527 of which the recessed amount with respect to the land portion 522 of the sliding surface 521 of the rotating seal ring 520 is smaller than that of the inclined groove 509 or the Rayleigh step 17. For that reason, since the fine recesses 523 and 527 are provided in the sliding surface 521 of the rotating seal ring 520 in a state in which the land portion 512 of the sliding surface 511 of the stationary seal ring 510 and the land portion 522 of the sliding surface 521 of the rotating seal ring 520 slide on each other in a contact state or a non-contact state to be slightly separated from each other between the sliding surfaces 511 and 521 of the stationary seal ring 510 and the rotating seal ring 520 rotating relative to each other, the surface regions X and X' in the periphery of the dynamic pressure generation mechanism 515 and the specific dynamic pressure generation mechanism 16 can be reliably in a non-contact state with respect to waviness or fine protrusions in the surface regions Y and Y' of the sliding surface 521 of the facing rotating seal ring 520. Accordingly, it is possible to reliably suppress the dynamic pressure generation mechanism 515 and the specific dynamic pressure generation mechanism 16 from being deformed and damaged due to the wear of the sliding surface 511 of the stationary seal ring 510 and to maintain the lubricity between the sliding surfaces 511 and 521.

In addition, in this sixth embodiment, the dynamic pressure generation mechanism 515 is not limited to the inclined groove, may be, for example, a groove of a spiral shape or an L shape having an arc side wall extending in the circumferential direction, and may have other shapes such as a dimple shape.

Further, the specific dynamic pressure generation mechanism 16 is formed in an inverted L shape when viewed from a direction orthogonal to the sliding surface 511 by the liquid guide groove portion 161 and the Rayleigh step 17, but the present invention is not limited thereto. For example, the specific dynamic pressure generation mechanism may be a groove of an inclined shape or a spiral shape and may have other shapes such as a dimple shape.

Figure 15:
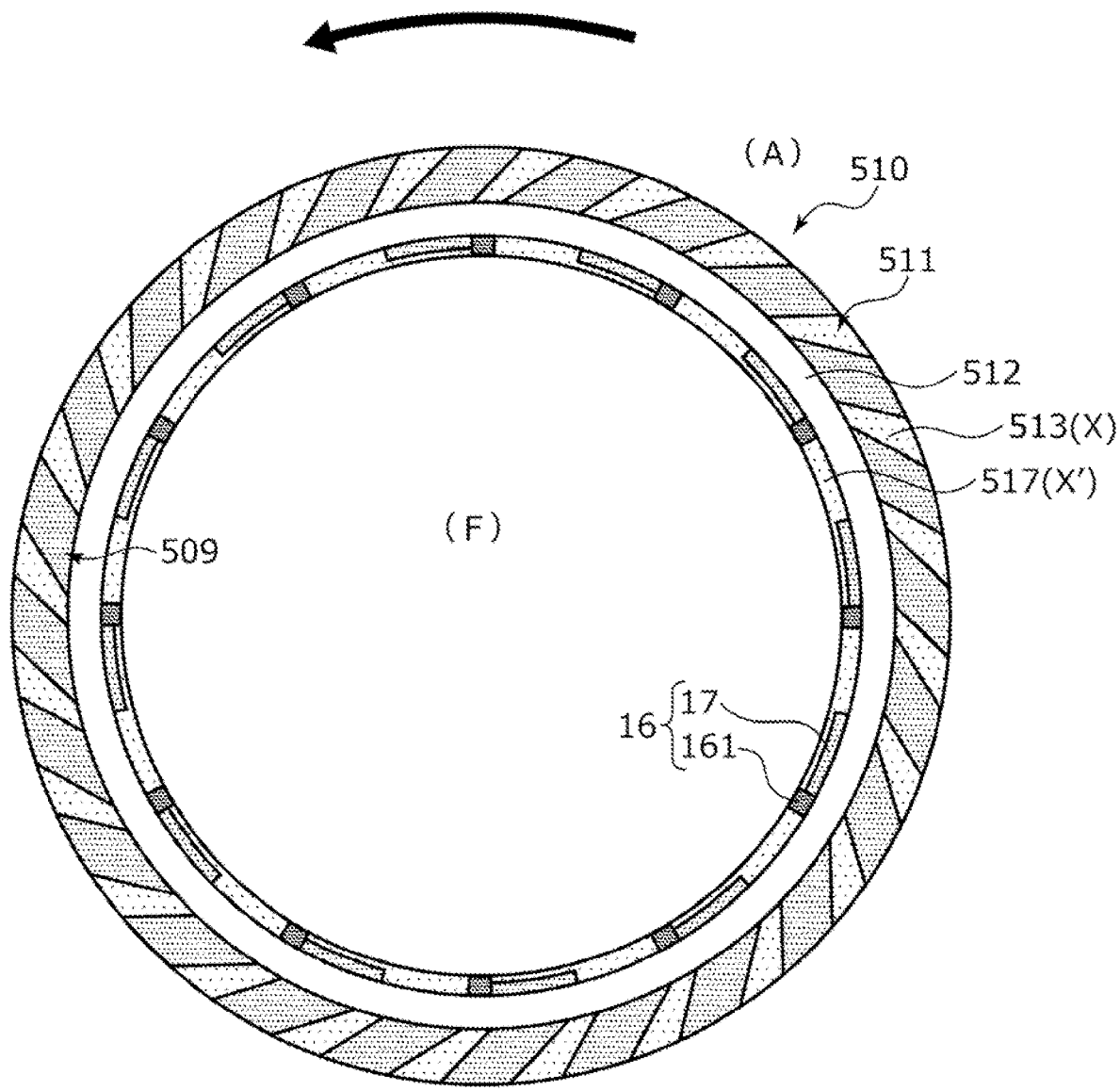
FIG. 15 is an explanatory diagram illustrating a modified example of the stationary seal ring in the sixth embodiment.

Further, as a modified example, as illustrated in FIG. 15, in the sliding surface 511 of the stationary seal ring 510, the surface regions X and X' in the periphery of the dynamic pressure generation mechanism 515 and the specific dynamic pressure generation mechanism 16 may be provided with an outer radial side fine recess 513 and an inner radial side fine recess 517 of which the recessed amount with respect to the land portion 512 of the sliding surface 511 is smaller than that of the inclined groove 509 or the Rayleigh step 17. In addition, one of the outer radial side fine recess 513 and the inner radial side fine recess 517 may be provided in the sliding surface 521 of the rotating seal ring 520.

Although the embodiments of the present invention have been described with reference to the drawings, the specific configuration is not limited to these embodiments and any changes or additions that do not deviate from the gist of the present invention are included in the present invention.

For example, in the above-described embodiments, a mechanical seal for general industrial machines has been described as the sliding components, but other mechanical seals for automobiles, water pumps, and the like may be used. Further, the present invention is not limited to the mechanical seal and sliding components other than a mechanical seal such as a slide bearing may be used.

Further, in the above-described embodiments, an example has been described in which the dynamic pressure generation mechanism is provided only in the stationary seal ring, but the dynamic pressure generation mechanism may be provided only in the rotating seal ring or may be provided in both the rotating seal ring and the stationary seal ring.

Further, in the above-described embodiments, an example has been described in which the sliding components are provided with the plurality of dynamic pressure generation mechanism having the same shape, but may be provided with the plurality of dynamic pressure generation mechanisms having different shapes. Further, the interval and number of the dynamic pressure generation mechanisms can be changed as appropriate.

Figure 16:
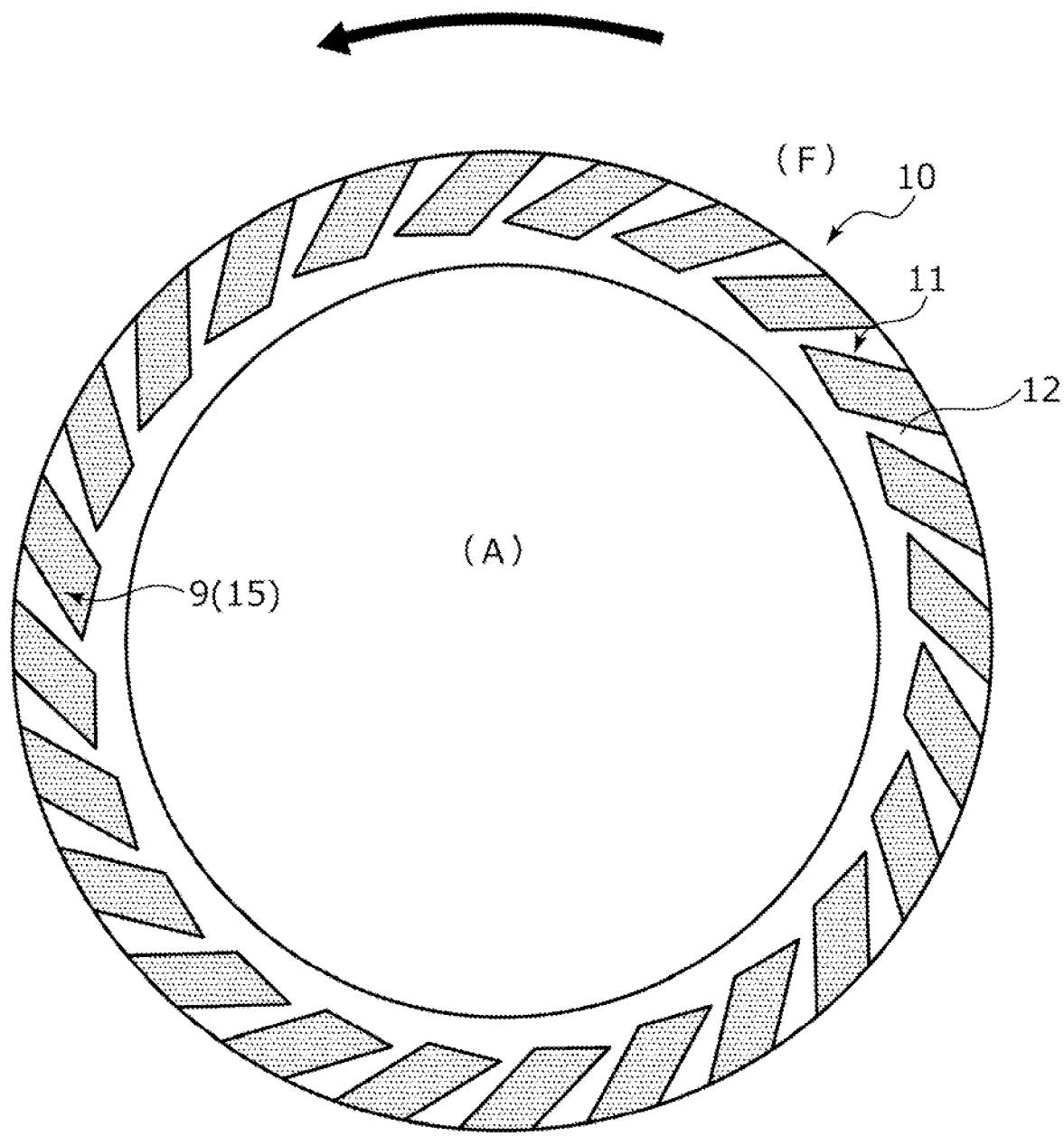
FIG. 16 is an explanatory diagram illustrating a modified example of the stationary seal ring of sliding components according to the present invention.

Further, in the above-described embodiments, a case has been described in which the mechanical seal is of an outside type that seals the sealed liquid F that tends to leak from the inner radial side toward the outer radial side of the sliding surface. However, the sliding components of the present invention may be applied to an inside type mechanical seal that seals the sealed liquid F that tends to leak from the outer radial side toward the inner radial side of the sliding surface and as illustrated in FIG. 16, the inclined groove 9 constituting the dynamic pressure generation mechanism 15 may communicate with the side of the sealed liquid F. Further, the configuration as illustrated in FIG. 16 may be applied to the sliding components of the second to sixth embodiments.

Further, although a case has been described in which the sealed fluid side is the high pressure side and the leakage side is the low pressure side, the sealed fluid side may be the low pressure side, the leakage side may be the high pressure side, and the sealed fluid side and the leakage side may have substantially the same pressure.

REFERENCE SIGNS LIST

9 Inclined groove (recessed portion, recessed groove)
9a Wall portion
9d Closed end portion (one end)
10 Stationary seal ring (sliding component)
11 Sliding surface
12 Land portion
15 Dynamic pressure generation mechanism
16 Specific dynamic pressure generation mechanism
17 Rayleigh step (recessed portion, recessed groove)
20 Rotating seal ring (sliding component)
21 Sliding surface
22 Land portion
23 Fine recess
110 Stationary seal ring (sliding component)
111 Sliding surface
112 Land portion
113 Fine recess
120 Rotating seal ring (sliding component)
121 Sliding surface
122 Land portion
161 Liquid guide groove portion (recessed portion, recessed groove)
210 Stationary seal ring (sliding component)
211 Sliding surface
212 Land portion
213 Fine recess
220 Rotating seal ring (sliding component)
221 Sliding surface
222 Land portion
223 Fine recess
310 Stationary seal ring (sliding component)
311 Sliding surface
312 Land portion
313 Fine recess
318 Independent land portion
410 Stationary seal ring (sliding component)
411 Sliding surface
412 Land portion
413 Fine recess
509 Inclined groove (recessed portion, recessed groove)
510 Stationary seal ring (sliding component)
511 Sliding surface
512 Land portion
513, 517 Fine recess
515 Dynamic pressure generation mechanism
520 Rotating seal ring (sliding component)
521 Sliding surface
522 Land portion
523, 527 Fine recess
A Low pressure side fluid
F Sealed liquid
X Surface region (surface region in periphery of recessed portions of first sliding component)
Y Surface region (opposite surface region of second sliding component)

The invention claimed is:

1. A pair of sliding components which is constituted by a first sliding component and a second sliding component and disposed at a relatively rotating position of a rotary machine, comprising a plurality of dynamic pressure generation mechanisms formed by recessed portions that are provided in a sliding surface of the first sliding component, the first sliding component and the second sliding component being formed in an annular shape to seal a sealed fluid by sliding a land portion of the sliding surface of the first sliding component and a land portion of a sliding surface of the second sliding component to each other, wherein a surface region in a periphery of the recessed portions of the first sliding component is formed to be separated from an opposite surface region of the second sliding component opposed to the surface region of the first sliding component, wherein the land portions of the first sliding component and the second sliding component each has an annular shape, the recessed portion is a recessed groove of which one end is closed, and the one end of the recessed groove extends to a region in which the land portions face each other, wherein adjoining two of the recessed portions are connected to each other by a fine recess, and wherein a boundary portion of the fine recess on a side of the land portion of the first sliding component is formed to be disposed on a waveform when viewed from an axial direction.

2. The pair of sliding components according to claim 1, wherein a fine recess which has an annular shape and is recessed from the land portion of the second sliding component is formed in the opposite surface region of the second sliding component.

3. The pair of sliding components according to claim 2, wherein a boundary portion of the fine recess on a side of the land portion of the second sliding component is formed in a waveform when viewed from an axial direction.

4. The pair of sliding components according to claim 1, wherein at least one independent land portion which is surrounded by the fine recess is formed between the adjoining two of the recessed portions.

5. The pair of sliding components according to claim 1, wherein each of the recessed portions is an inclined groove.

6. The pair of sliding components according to claim 1, wherein each of the recessed portions communicates with a leakage side.

7. The pair of sliding components according to claim 1, wherein the sliding surface of the first sliding component is provided with specific dynamic pressure generation mechanisms which are disposed on a sealed fluid side with respect to the dynamic pressure generation mechanisms and which are formed by recessed portions independent from the dynamic pressure generation mechanism, and wherein a surface region in a periphery of the recessed portions of the specific dynamic pressure generation mechanisms in the first sliding component is formed to be separated from an opposite surface region of the second sliding component opposed to the surface region of the first sliding component.

8. The pair of sliding components according to claim 2, wherein each of the recessed portions is an inclined groove.

9. The pair of sliding components according to claim 2, wherein each of the recessed portions communicates with a leakage side.

* * * * *